United States Patent
Cobb et al.

(10) Patent No.: US 11,468,660 B2
(45) Date of Patent: *Oct. 11, 2022

(54) PIXEL-LEVEL BASED MICRO-FEATURE EXTRACTION

(71) Applicant: Intellective Ai, Inc., Dallas, TX (US)

(72) Inventors: Wesley Kenneth Cobb, The Woodlands, TX (US); Rajkiran K. Gottumukkal, Houston, TX (US); Kishor Adinath Saitwal, Houston, TX (US); Ming-Jung Seow, The Woodlands, TX (US); Gang Xu, Katy, TX (US); Lon W. Risinger, Katy, TX (US); Jeff Graham, League City, TX (US)

(73) Assignee: Intellective Ai, Inc., Dallas, TX (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/931,921

(22) Filed: Jul. 17, 2020

(65) Prior Publication Data

US 2021/0042556 A1 Feb. 11, 2021

Related U.S. Application Data

(63) Continuation of application No. 16/033,264, filed on Jul. 12, 2018, now Pat. No. 10,755,131, which is a (Continued)

(51) Int. Cl.
*G06K 9/00* (2022.01)
*G06V 10/40* (2022.01)
(Continued)

(52) U.S. Cl.
CPC .............. *G06V 10/40* (2022.01); *G06V 10/25* (2022.01); *G06V 10/46* (2022.01); *G06V 10/507* (2022.01); *H04N 7/18* (2013.01); *G06V 10/473* (2022.01)

(58) Field of Classification Search
None
See application file for complete search history.

(56) References Cited

U.S. PATENT DOCUMENTS

| 4,679,077 A | 7/1987 | Yuasa et al. |
| 5,113,507 A | 5/1992 | Jaeckel |

(Continued)

FOREIGN PATENT DOCUMENTS

| KR | 10-2008-0044812 A | 5/2008 |
| WO | WO 2009/049314 | 4/2009 |

OTHER PUBLICATIONS

International Search Report and Written Opinion for International Application No. PCT/US2009/056559, dated Mar. 30, 2010, 12 pages.

(Continued)

*Primary Examiner* — Randolph I Chu
(74) *Attorney, Agent, or Firm* — Cooley LLP

(57) ABSTRACT

Techniques are disclosed for extracting micro-features at a pixel-level based on characteristics of one or more images. Importantly, the extraction is unsupervised, i.e., performed independent of any training data that defines particularly objects, allowing a behavior-recognition system to forgo a training phase and for object classification to proceed without being constrained by specify object definitions. A micro-feature extractor that does not require training data is adaptive and self-trains while performing the extraction. The extracted micro-features are represented as a micro-feature vector that may be input to a micro-classifier which groups object into object type clusters based on the micro-feature vectors.

20 Claims, 21 Drawing Sheets

Related U.S. Application Data continuation of application No. 15/461,139, filed on Mar. 16, 2017, now Pat. No. 10,049,293, which is a continuation of application No. 12/543,141, filed on Aug. 18, 2009, now Pat. No. 9,633,275.

(60) Provisional application No. 61/096,031, filed on Sep. 11, 2008.

(51) Int. Cl.
| | |
|---|---|
| *H04N 7/18* | (2006.01) |
| *G06V 10/25* | (2022.01) |
| *G06V 10/46* | (2022.01) |
| *G06V 10/50* | (2022.01) |

(56) References Cited

U.S. PATENT DOCUMENTS

| | | | |
|---|---|---|---|
| 5,748,775 A | 5/1998 | Tsuchikawa et al. | |
| 5,751,378 A | 5/1998 | Chen et al. | |
| 5,969,755 A | 10/1999 | Courtney | |
| 6,169,981 B1 * | 1/2001 | Werbos | G05B 13/0265 |
| | | | 706/23 |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 9,633,275 B2 | 4/2017 | Cobb et al. | |
| 10,049,293 B2 * | 8/2018 | Cobb | G06K 9/4647 |
| 10,755,131 B2 * | 8/2020 | Cobb | H04N 7/18 |
| 2003/0107650 A1 | 6/2003 | Colmenarez et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2007/0058836 A1 * | 3/2007 | Boregowda | G06K 9/00771 |
| | | | 382/103 |
| 2008/0002856 A1 | 1/2008 | Ma et al. | |
| 2008/0131004 A1 | 6/2008 | Farmer et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0089078 A1 * | 4/2009 | Bursey | H04W 4/70 |
| | | | 705/300 |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2011/0044537 A1 * | 2/2011 | Cobb | G06K 9/6222 |
| | | | 382/165 |
| 2012/0002747 A1 | 11/2012 | Saptharishi et al. | |
| 2019/0180135 A1 | 6/2019 | Cobb et al. | |

OTHER PUBLICATIONS

Connell, J. et al., "Detection and Tracking in the IBM PeopleVision System," IEEE ICME, Jun. 2004, pp. 1-4.

Grabner, H. et al., "On-line Boosting and Vision," IEEE Conference on Computer Vision and Pattern Recognition (CVPR), 2006, vol. 1, pp. 260-267.

Haritaoglu, I. et al., "Ghost: A Human Body Part Labeling System Using Silhouettes," 14th Annual International Conference on Pattern Recognition, Aug. 16-20, 1998, Brisbane, Australia, pp. 77-82.

Nock, R. et al., "Statistical Region Merging," IEEE Transactions on Pattern Analysis and Machine Intelligence, Nov. 2004, vol. 26(11):1452-1458.

Apewokin, S. et al., "Multimodal Mean Adaptive Backgrounding for Embedded Real-Time Video Surveillance," Jun. 2007, IEEE, 6 pages.

Elgammal, A. et al., "Non-parametric Model for Background Substraction," Computer Vision Laboratory, University of Maryland, Jun. 2000, 17 pages.

Haritaoglu, I. et al., "W4: Real-Time Surveillance of People and Their Activities," IEEE Transactions on Pattern Analysis and Machine Intelligence, Aug. 2000, vol. 22, No. 8, pp. 809-830.

Ivanov, Y. et al., "Video Surveillance of Interactions," MIT Media Laboratory, Cambridge, MA, Jul. 1999, 8 pages.

Stauffer, C. et al., "Adaptive background mixture models for real-time tracking," Proceedings IEEE Conference on Computer Vision and Pattern Recognition, 1999, pp. 246-252.

Kanerva, P., Chapter 3: "Sparse Distributed Memory and Related Models," In M. H. Hassoun, ed., Associative Neural Memories: Theory and Implementation, 1993, pp. 50-76, New York: Oxford University Press.

Senior, A. et al., "Appearance Models for Occlusion Handling," IBM T. J. Watson Research Center, 2001, 8 pages, Yorktown, Heights, NY US.

Stauffer, C. et al., "Learning Patterns of Activity Using Real-Time Tracking," IEEE Transactions on Pattern Analysis and Machine Intelligence (TPAMI), Aug. 2000, 22(8):747-757.

* cited by examiner

PIXEL-LEVEL BASED MICRO-FEATURE EXTRACTION

CROSS-REFERENCE TO RELATED APPLICATIONS

This application is a Continuation of and claims priority to U.S. application Ser. No. 16/033,264, filed Jul. 12, 2018, which in turn is a Continuation of U.S. application Ser. No. 15/461,139, filed Mar. 16, 2017, issued as U.S. Pat. No. 10,049,293 on Aug. 14, 2018, which in turn is a Continuation of U.S. application Ser. No. 12/543,141, filed Aug. 18, 2009, issued as U.S. Pat. No. 9,633,275 on Apr. 25, 2017, and which in turn claims priority to and benefit of U.S. provisional application Ser. No. 61/096,031, filed Sep. 11, 2008; the entire contents of each of the aforementioned applications are herein expressly incorporated by reference in their entirety.

FIELD

Embodiments of the disclosure provide techniques for extracting pixel-level micro-features from image data. More specifically, embodiments of the disclosure relate to techniques for producing a micro-feature vector for the image data that is used to classify objects depicted in the image data.

BACKGROUND

Some currently available video surveillance systems provide simple object recognition capabilities.

SUMMARY

Some video surveillance systems may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine the type of object that the "blob" is. However, such surveillance systems typically require that the objects which may be recognized by the system to be defined in advance. Thus, in practice, these systems rely on predefined definitions for objects to evaluate a video sequence. In other words, unless the underlying system includes a description for a particular object, i.e., has been trained, the system is generally incapable of recognizing that type of object. This results in surveillance systems with recognition capabilities that are labor intensive and prohibitively costly to maintain or adapt for different specialized applications. Accordingly, currently available video surveillance systems are often unable to identify objects, events, behaviors, or patterns as being "normal" or "abnormal" by observing what happens in the scene over time; instead, such systems rely on static object definitions.

Further, the static patterns recognized by available video surveillance systems are frequently either under inclusive (i.e., the pattern is too specific to recognize many instances of a given object) or over inclusive (i.e., the pattern is general enough to trigger many false positives). In some cases, the sensitivity of may be adjusted to help improve the recognition process, however, this approach fundamentally relies on the ability of the system to recognize predefined patterns for objects. As a result, by restricting the range of objects that a system may recognize using a predefined set of patterns, many available video surveillance systems have been of limited (on simply highly specialized) usefulness.

Embodiments of the disclosure relate to techniques for a classifier component to extract pixel-level micro-features of images. The pixel-level micro-features may be used to classify objects independent of any object definition data, i.e., without training.

One embodiment of the disclosure includes a computer-implemented method for extracting pixel-level micro-features from image data captured by a video camera. The method may generally include receiving the image data, identifying a foreground patch that depicts a foreground object, processing the foreground patch to compute a micro-feature value based on at least one pixel-level characteristic of the foreground patch, where the micro-feature value is computed independent of training data that defines a plurality of object types, and generating a micro-feature vector that includes the micro-feature value. The method may also include classifying the foreground object as depicting an object type as based on the micro-feature vector.

Another embodiment of the disclosure includes a computer-readable storage medium containing a program which, when executed by a processor, performs an operation for extracting pixel-level micro-features from image data captured by a video camera. The operation may generally include receiving the image data, identifying a foreground patch that depicts a foreground object, processing the foreground patch to compute a micro-feature value based on at least one pixel-level characteristic of the foreground patch, where the micro-feature value is computed independent of training data that defines a plurality of object types, and generating a micro-feature vector that includes the micro-feature value. The operation may also include classifying the foreground object as depicting an object type as based on the micro-feature vector.

Still another embodiment includes a system having a video input source configured to provide image data. The system may also include processor and a memory containing a program, which, when executed on the processor is configured to perform an operation for extracting pixel-level micro-features from the image data provided by the video input source. The operation may generally include receiving the image data, identifying a foreground patch that depicts a foreground object, processing the foreground patch to compute a micro-feature value based on at least one pixel-level characteristic of the foreground patch, where the micro-feature value is computed independent of training data that defines a plurality of object types, and generating a micro-feature vector that includes the micro-feature value. The operation may also include classifying the foreground object as depicting an object type as based on the micro-feature vector.

BRIEF DESCRIPTION OF THE DRAWINGS

So that the manner in which the above recited features, advantages, and objects of the present disclosure are attained and can be understood in detail, a more particular description of the disclosure, briefly summarized above, may be had by reference to the embodiments illustrated in the appended drawings.

It is to be noted, however, that the appended drawings illustrate only example embodiments of this disclosure and are therefore not to be considered limiting of its scope, for the disclosure may admit to other equally effective embodiments.

DETAILED DESCRIPTION

Figure 1:
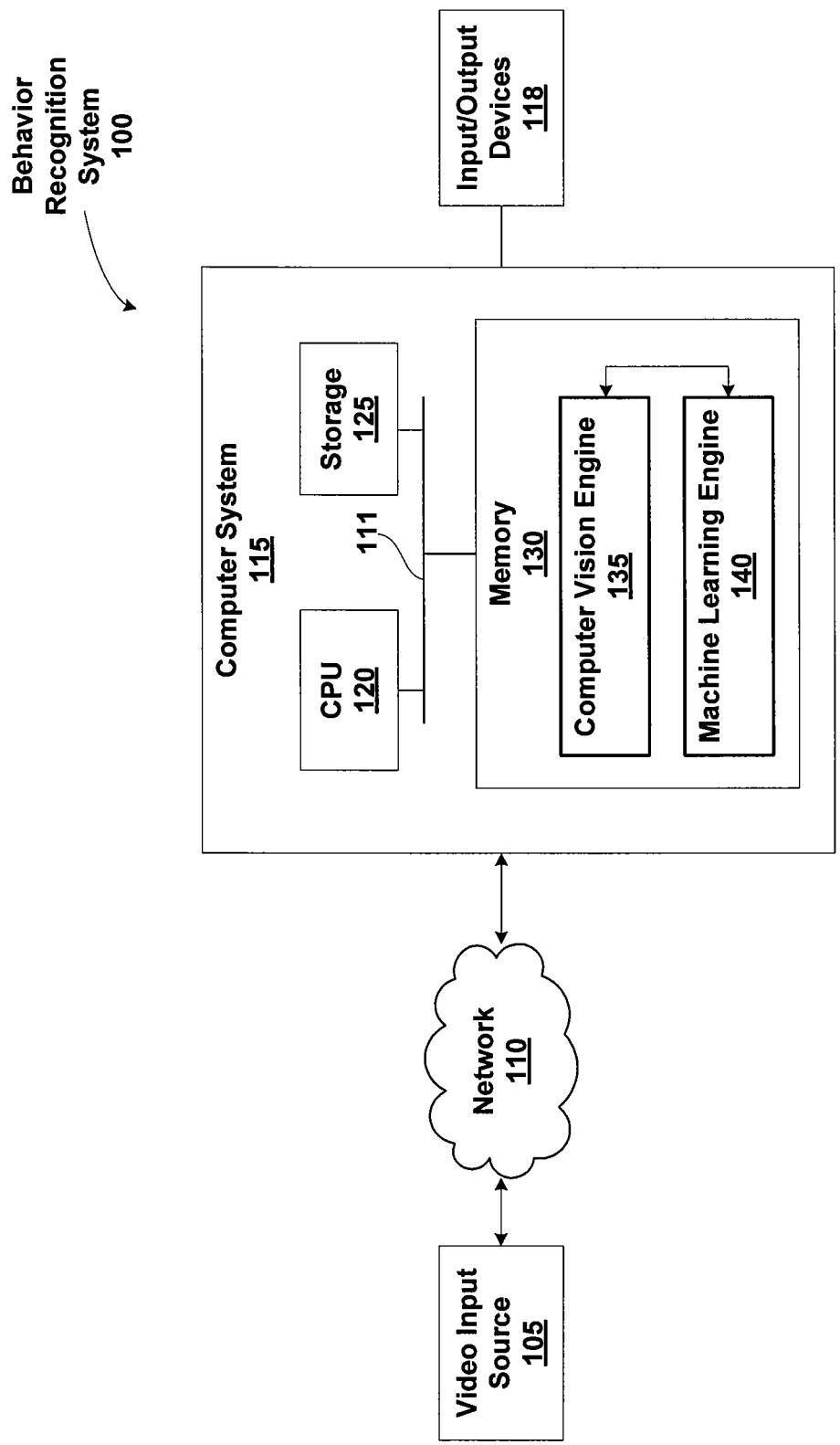
FIG. 1 illustrates components of a video analysis system, according to one embodiment of the disclosure.

Embodiments of the disclosure extract micro-features of one or more images based on pixel-level characteristics. The extraction is unsupervised, i.e., performed independent of any training data that defines particular objects, allowing a behavior-recognition system to forgo a training phase and for object classification to proceed without being constrained by specific object definitions. A micro-feature extractor that does not require training data is adaptive and self-trains while performing the extraction. The extracted micro-features are heuristic features of foreground patches depicting objects and are represented as a micro-feature vector that is input to a micro-classifier which identifies particular object types.

The micro-feature extractor and micro-classifier may be included within a behavior-recognition system which may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to receive and evaluate a stream of video frames. Each frame may include data representing the color, grayscale, and/or intensity values for each pixel in the frame. A frame of video may be characterized using multiple color channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a group of pixels in the scene (referred to as a "blob" or "patch") is observed with appearance values that differ substantially from the background image, that region is identified as a foreground patch that likely depicts a foreground object. As described in greater detail below, pixel-level characteristics of the foreground patch are computed and used to extract pixel-level micro-features that are represented as a micro-feature vector. The micro-feature vector corresponding to the foreground patch may be evaluated to allow the system to distinguish among different types of foreground objects (e.g., a vehicle or a person) on the basis of the micro features. Further, the computer vision engine may identify features (e.g., height/width in pixels, color values, shape, area, pixel distributions, and the like) used to track the object from frame-to-frame. Further still, the computer vision engine may derive a variety of information while tracking the object from frame-to-frame, e.g., position, current (and projected) trajectory, direction, orientation, velocity, rigidity, acceleration, size, and the like. In one embodiment, the computer vision outputs this information and/or the micro-feature vector as a stream describing a collection of kinematic information related to each foreground patch in the video frames.

Data output from the computer vision engine may be supplied to the machine learning engine. In one embodiment, the machine learning engine may evaluate the context events to generate "primitive events" describing object behavior. Each primitive event may provide some semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories representing a higher-level abstraction of a car parking in the scene—generated from the primitive events underlying the higher-level abstraction. Further still, patterns representing an event of interest may result in alerts passed to users of the behavioral recognition system.

In the following, reference is made to embodiments of the disclosure. However, it should be understood that the invention/disclosure is not limited to any specifically described embodiment. Instead, any combination of the following features and elements, whether related to different embodiments or not, is contemplated to implement and practice the disclosure. Furthermore, in various embodiments the disclosure provides numerous advantages over the prior art. However, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the disclosure is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the disclosure can be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present disclosure. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

The computer vision engine 135 may be configured to analyze this raw information to identify foreground patches depicting active objects in the video stream, extract micro-features, and derive a variety of metadata regarding the actions and interactions of such objects, and supply this information to a machine learning engine 140. In turn, the machine learning engine 140 may be configured to classify the objects, evaluate, observe, learn and remember details regarding events (and types of events) that transpire within the scene over time.

In one embodiment, the machine learning engine 140 receives the video frames and the data generated by the computer vision engine 135. The machine learning engine 140 may be configured to analyze the received data, classify objects, build semantic representations of events depicted in the video frames, detect patterns, and, ultimately, to learn from these observed patterns to identify normal and/or abnormal events. Additionally, data describing whether a normal/abnormal behavior/event has been determined and/or or what such behavior/event is may be provided to output devices 118 to issue alerts, for example, an alert message presented on a GUI interface screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
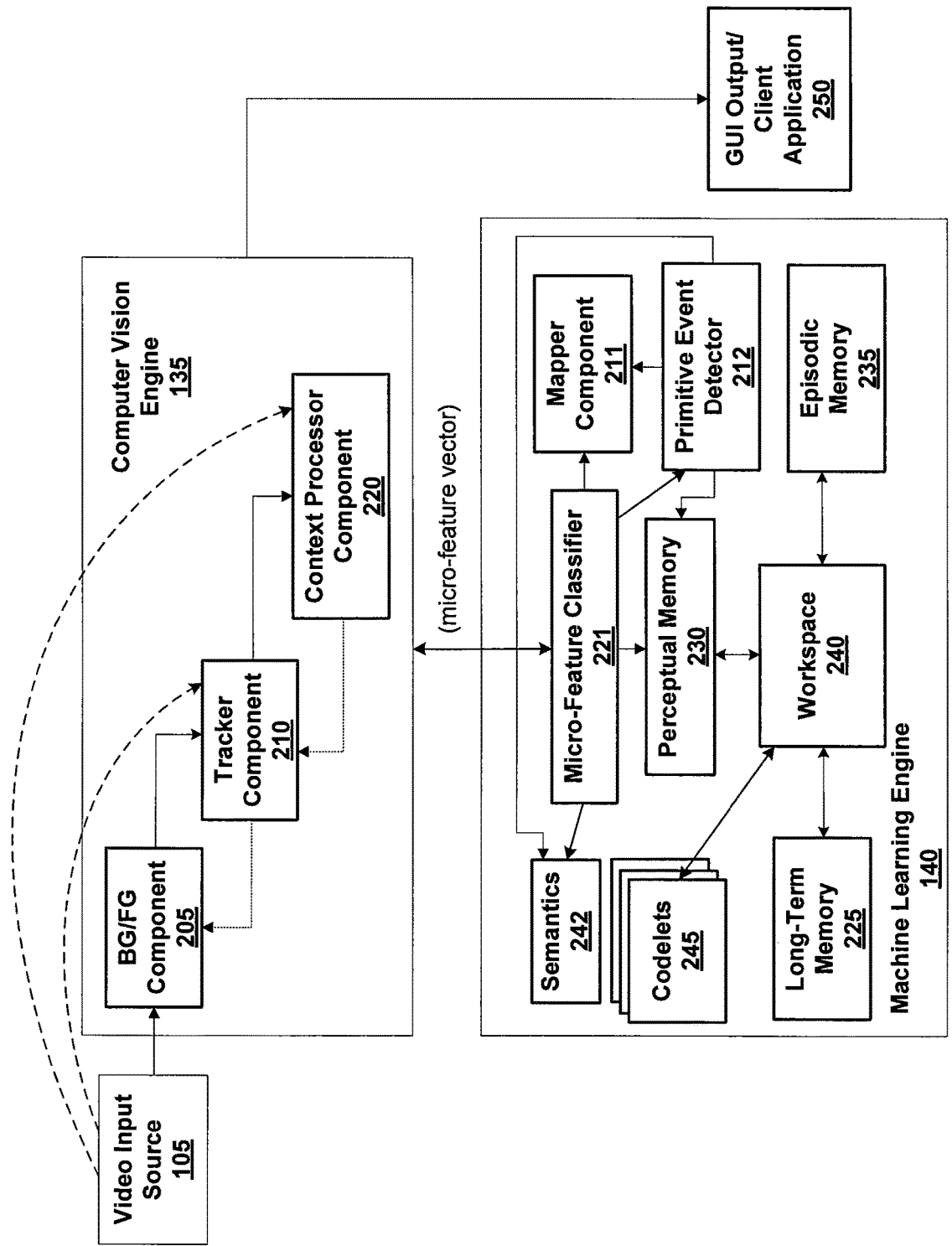
FIG. 2 further illustrates components of the video analysis system shown in FIG. 1, according to one embodiment of the present disclosure.

FIG. 2 further illustrates components of the computer vision engine 135 and the machine learning engine 140 first illustrated in FIG. 1, according to one embodiment of the present disclosure. As shown, the computer vision engine 135 includes a background/foreground (BG/FG) component 205, a tracker component 210, and a context processor component 220. Collectively, the components 205, 210, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, and 220 may each provide a software module configured to provide the functions described herein. Of course one of ordinary skill in the art will recognize that the components 205, 210, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground). The frame itself may include a two-dimensional array of pixel values for multiple channels (e.g., RGB channels for color video or grayscale channel or radiance channel for black and white video). The BG/FG component 205 may be configured to generate a mask used to identify which pixels of the scene have been determined to depict scene foreground and, conversely, which pixels have been determined to depict scene background. The BG/FG component 205 then identifies groups of pixels in the scene that contain a portion of scene foreground (referred to as a foreground "blob" or "patch") and supplies this information to subsequent stages of the pipeline. Additionally, portions of the scene determined to depict scene background may be used to update pixel values in a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The context processor component 220 may receive the output from other stages of the pipeline (i.e., the tracked objects and the background and foreground models). Using this information, the context processor 220 may be configured to generate a stream of micro-feature vectors corresponding to foreground patches tracked (by tracker component 210). For example, the context processor component 220 may evaluate a foreground patch from frame-to-frame and output micro-feature vectors including values representing the foreground patch's hue entropy, magnitude-saturation ratio, orientation angle, pixel area, aspect ratio, groupiness (based on the pixel-level spatial distribution), leggedness, motion vector orientation, rigidity/animateness, periodicity of motion, etc. Additionally, the context processor component 220 may output a stream of context events describing that foreground patch's height, width (in pixels), position (as a 2D coordinate in the scene), acceleration, velocity, orientation angle, etc. The computer vision engine 135 may take the outputs of the components 205, 210, and 220 describing the motions and actions of the tracked foreground patches in the scene and supply this information to the machine learning engine 140.

In some systems, the computer vision engine is configured to classify each tracked object as being one of a known category of objects using training data that defines a plurality of object types. For example, an estimator/identifier component may be included within the computer vision engine to classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object. Such an estimator/identifier component is provided with training data that specifies a plurality of objects that is used to perform the classification.

In contrast, systems that do not include an estimator/identifier component, such the computer vision engine 135 shown in FIG. 2, the classification of objects is performed by the micro-feature classifier 221 in the machine learning engine 140 using the micro-feature vectors that are produced by the computer vision engine 135 independent of any training data. By processing the foreground patches independent of training data, extraction and classification may begin earlier and can adapt to recognize a variety of different object types dependent on the specific image data. In particular, since the range of object types is not defined by training data the range is also not restricted. When micro-features are used to classify, objects with similar micro-feature vectors are grouped together in object type clusters. In some embodiments, the micro-feature classifier 221 may use a combination of a self-organizing map (SOM) adaptive resonance theory (ART) network to assign micro-feature vectors to clusters. In such a case, each cluster represents a distinct object type, without the distinct types having to be defined in advance. Additionally, in some embodiments the behavior recognition system 100 may be configured to present the foreground objects in a particular object type cluster to a user in order to allow the user to specify an object type label for the cluster.

As is known, a SOM-ART network provides a specialized neural network configured to create object type clusters from a group of inputs, e.g., micro-features vectors. Each object type cluster itself may be characterized by a mean and a variance from a prototype input representing that cluster. The prototype is generated first, as a copy of the input vector used to create a new object type cluster. Subsequently, prototype may be updated as new inputs are mapped to that object type cluster. Additionally, an object type cluster may be characterized by how many input vectors have been used to update that object type cluster—after it is initially created. Typically, the more input vectors that map to a given object type cluster, the more significant that object type cluster.

For example, a SOM-ART network may receive a micro-feature vector as input and either update an existing cluster or create a new object type cluster, as determined using a choice test and a vigilance test for the ART network. The choice and vigilance tests are used to evaluate the micro-feature vector passed to the ART network. The choice test provides a ranking of the existing object type clusters, relative to the micro-feature vector input data. Once ranked, the vigilance test evaluates the existing object type clusters to determine whether to map the foreground patch to a given object type cluster. If no object type cluster is found to update using the data supplied to the input layer, evaluated sequentially using the ranked object type clusters, then a new object type cluster is created. That is, once a pattern is found (i.e., the input "matches" an existing cluster according to the choice and vigilance tests), the prototype for that object type cluster is updated based on the values of the input micro-feature vector. Otherwise, if the micro-feature vector does not match any available object type cluster (using the vigilance test), a new object type cluster is created by storing a new pattern similar to the micro-feature vector. Subsequent micro-feature vectors that most closely resemble the new object type cluster (relative to the others) are then used to update that object type cluster.

In one embodiment, the primitive event detector 212 may be configured to receive the output of the computer vision engine 135 (i.e., the video images, the micro-feature vectors, and context event stream) and generate a sequence of primitive events—labeling the observed actions or behaviors in the video with semantic meaning. For example, assume the micro-feature classifier 221 has classified a foreground object as being a member of an object type cluster including vehicles based on the context event stream and/or micro-feature vectors received from the computer vision engine 135. The primitive event detector 212 may generate a semantic symbol stream that is output to the semantics component 242, providing a simple linguistic description of actions engaged in by the foreground object. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream and micro-feature vectors) and a primitive event stream generated by primitive event detector 212. The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time.

Generally, the workspace 240 provides a computational engine for the machine learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine learning engine 140 performs a cognitive cycle used to observe, and learn, about patterns of behavior that occur within the scene.

Figure 3A:
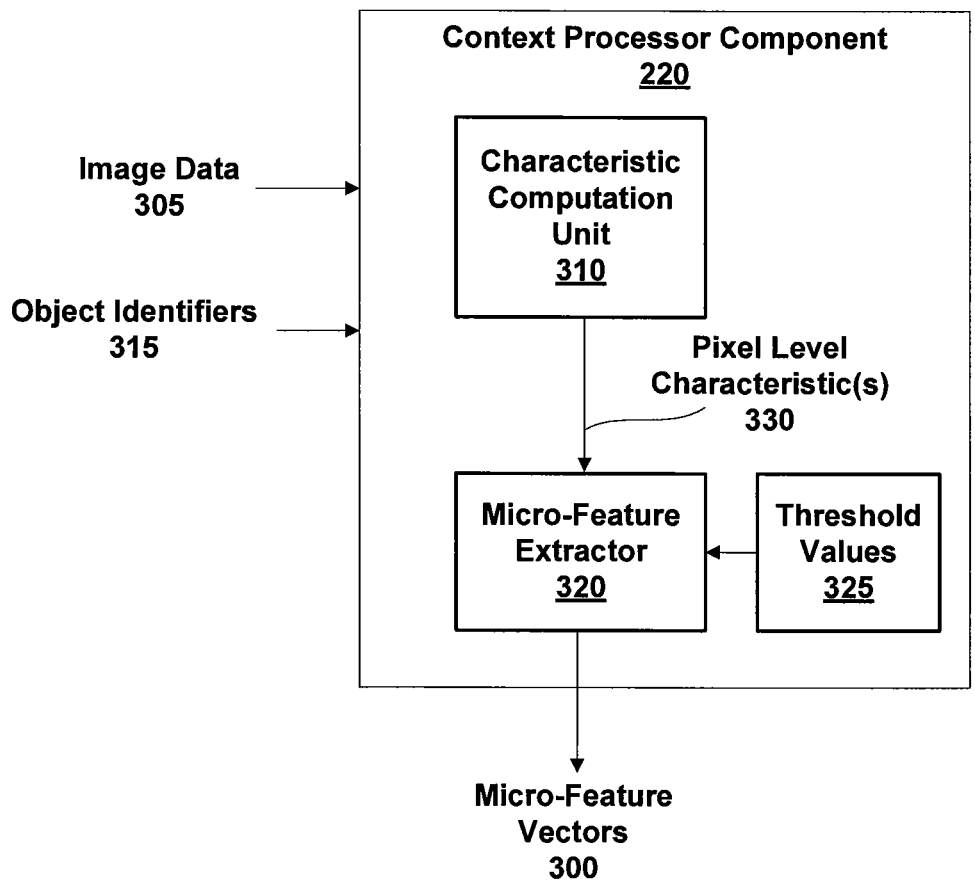
FIG. 3A illustrates an example of a context processor component of the video analysis system shown in FIG. 2, according to one embodiment of the disclosure.

FIG. 3A illustrates an example of the context processor component 220 of the video analysis system shown in FIG. 2, according to one embodiment of the disclosure. As stated, the context processor component 220 may be configured to receive image data 305 including background and foreground patches with corresponding object identifiers 315 from video input source 105 and BG/FG component 205. Rather than specifying an object type, the object identifier 315 uniquely identifies each foreground patch. The context processor component 220 also receives tracking information from tracker component 210. That is, the tracking information is used to follow an object as it moves about the scene—allowing the context processor component 220 to relate the depiction of the object in one frame to the depiction of that object in subsequent frames. Context processor component 220 includes a characteristic computation unit 310, micro-feature extractor 320, and threshold values 325. The characteristic computation unit 310 is configured to process the image data and produce pixel-level characteristic(s) 330. The pixel-level characteristic(s) 330 may include hue values, saturation values, magnitude values, orientation of a major axis of the foreground patch, a foreground patch bounding box, area of the foreground patch, horizontal and vertical pixel distribution, a star skeleton and corresponding angles, per-pixel position gradients, covariance matrices, frequency spectrums, and the like, for the foreground patches.

The micro-feature extractor 320 receives the pixel level characteristic(s) 330 and computes micro-feature values that are output as elements of the micro-feature vectors 300. Examples of micro-feature values include values representing the foreground patch's hue entropy, magnitude-saturation ratio, orientation angle, pixel area, aspect ratio, groupiness (based on the pixel-level spatial distribution), leggedness, verticality (based on per-pixel gradients), animateness, periodicity of motion, etc. Valid micro-feature values may range in value from 0 to 1 (inclusive) and −1 may be used to represent an invalid micro-feature value that should not be used for classification. The micro-feature values may be represented in a floating point format.

Threshold values 325 stores values that are used by the micro-feature extractor 320 to determine whether or not a valid micro-feature value may be computed. When a valid micro-feature value cannot be computed, according to the threshold value for that particular micro-feature, the micro-feature value is set to a predetermined value, e.g., −1. The threshold values for each particular micro-feature may be programmed. Examples of threshold values include a minimum area of a foreground patch, a minimum height or width of a bounding box, the minimum speed for being able to compute the moving angle of a tracked object.

Figure 3B:
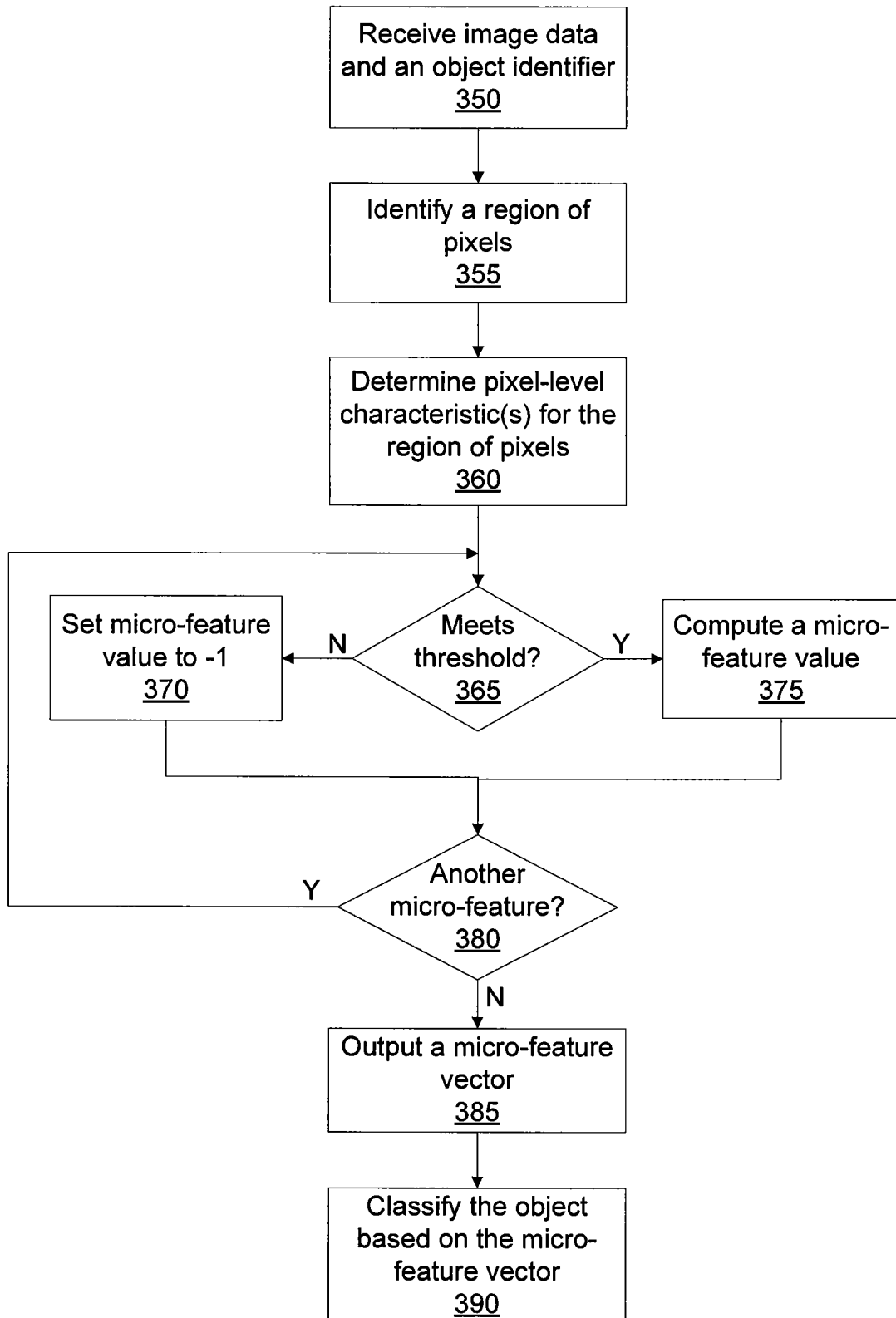
FIG. 3B illustrates a method for extracting pixel-level based micro-features, according to one embodiment of the disclosure.

FIG. 3B illustrates a method for extracting pixel-level based micro-features, according to one embodiment of the disclosure. As shown, the method begins at step 350 where the image data and an object identifier are received by characteristic computation unit 310. At step 355 the characteristic computation unit 310 identifies a region of pixels that includes the foreground patch identified by the BG/FG component 205. The region may be a bounding box that is minimally-sized to include the foreground patch or a larger region that includes the foreground patch. At step 360 the characteristic computation unit 310 determines one or more pixel-level characteristics for the region of pixels and outputs the pixel-level characteristics to the micro-feature extractor 320.

At step 365 the micro-feature extractor 320 determines if a threshold value provided by threshold values 325 is met for the region of pixels, and, if not, at step 370 the micro-feature value is set to −1. Otherwise, at step 375, the micro-feature value is computed, as described further herein. At step 380 the micro-feature extractor 320 determines if another micro-feature value should be computed, and, if so, then steps 365 and step 370 or 375 are repeated to produce each additional micro-feature value. The computation of specific micro-features may be enabled or disabled.

When the micro-feature extractor 320 determines that all of the micro-feature values have been computed in step 380, the micro-feature extractor 320 proceeds to step 385 and outputs a micro-feature vector for the foreground patch that includes each of the computed micro-feature values as an element in the vector. At step 390 the machine-learning engine 140 classifies the foreground patch into an object type cluster using the micro-feature vector 390. Typically, it is expected that foreground patches depicting different instances of the same object type (e.g., vehicles) will have similar micro-feature vector values. By using a variety of the different micro-features, a greater number of different object type clusters may be generated to allow the micro-feature classifier to more accurately distinguish between different types of foreground objects present in a given scene. That is, the micro-feature classifier allows the system to distinguish between vehicles and people, without having to rely on predefined descriptions or definitions of these object types.

Figure 4A:
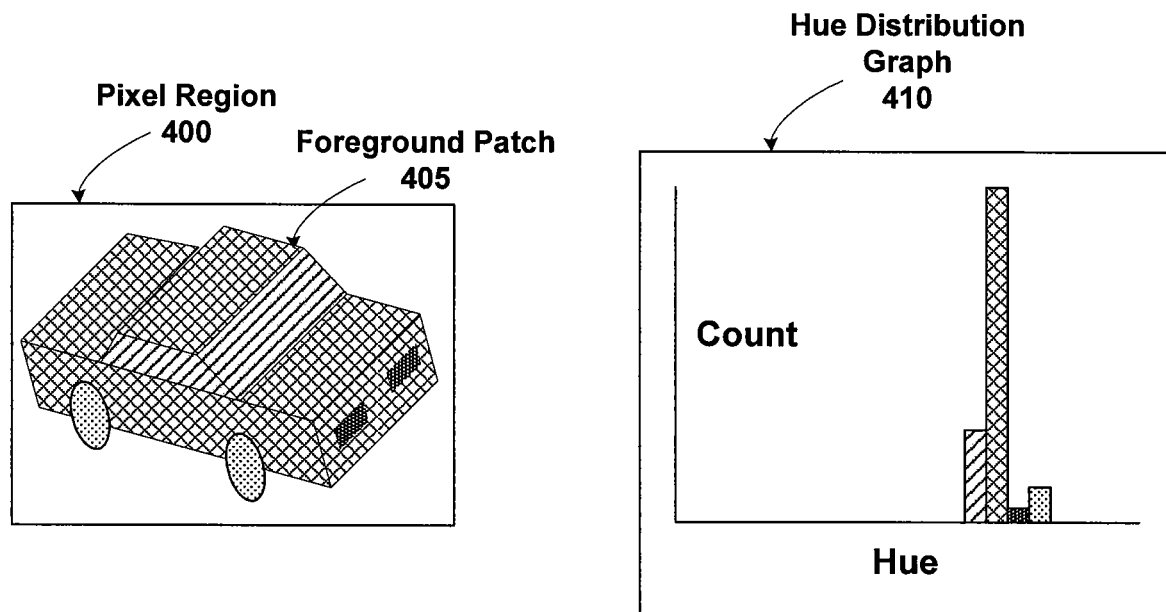
FIG. 4A illustrates a graphical representation of foreground patches and corresponding hue distribution graphs, according to one embodiment of the disclosure.
Figure 4A:
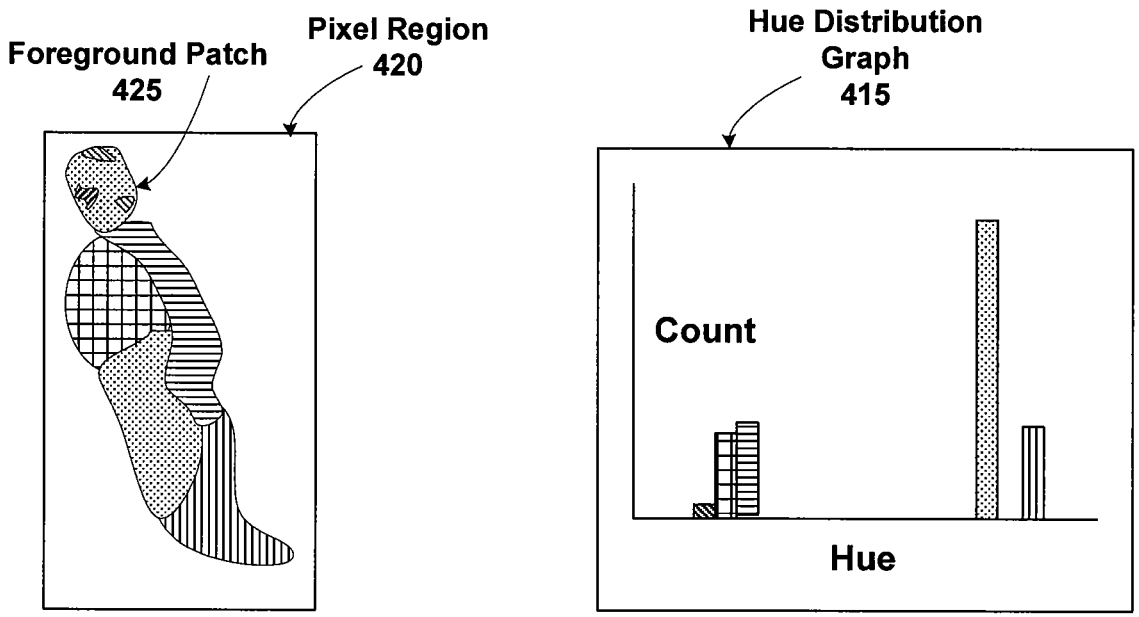

FIG. 4A illustrates a graphical representation of foreground patches 405 and 425 and corresponding hue (color) distribution graphs 410 and 415, according to one embodiment of the disclosure. Pixel region 400 includes a foreground patch 405 depicting a first foreground object. The different patterns for different portions of the foreground patch 405 indicate different hues. The hue distribution graph 410 indicates a pixel count for each of the different hues within the foreground patch 405. Pixel region 420 includes a foreground patch 425 depicting a second foreground object that should be grouped into a different object type cluster than the first foreground object. Again, the different patterns for different portions of the foreground patch 425 indicate different hues and the hue distribution graph 415 indicates a pixel count for each of the different hues within the foreground patch 425. Notice that the hues shown in hue distribution graph 415 have a wider hue variation compared with the hues shown in hue distribution graph 410. Based on the analysis of many images and image sequences, foreground patches corresponding to vehicles have lower hue entropy, i.e, have more uniform color, compared with foreground patches corresponding to people. Therefore, hue entropy is a micro-feature value that may contribute to classifying the foreground patch into a particular object type cluster over another object type cluster. Similarly, a measure of shininess or specular reflectivity of the foreground patch may be used to distinguish between different types of objects observed in a scene. Shininess may be indicated by the ratio of color magnitude to saturation.

Figure 4B:
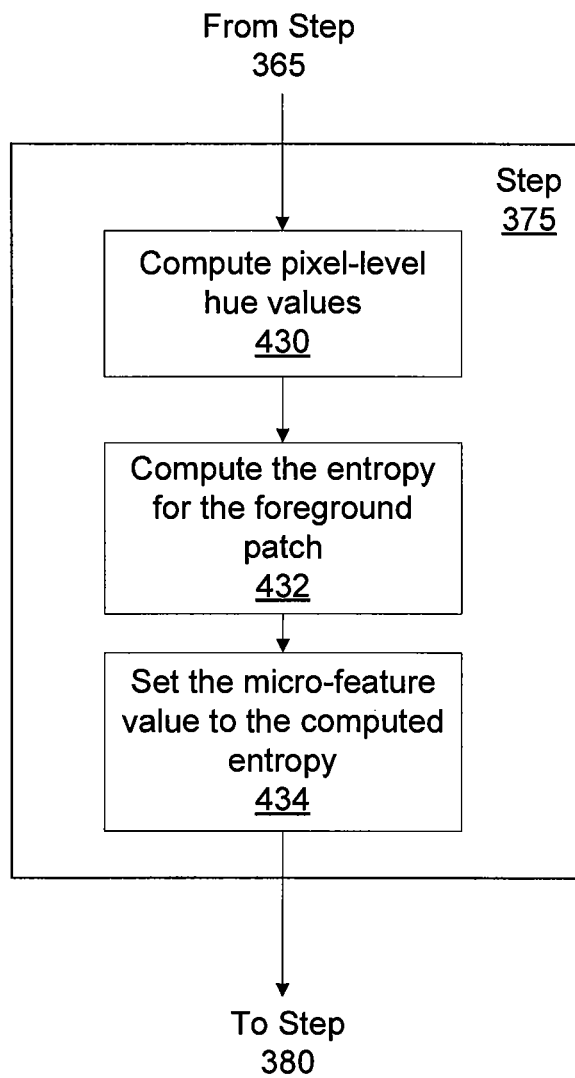
FIG. 4B illustrates a method for computing a micro-feature value based on the pixel-level hue characteristic, according to one embodiment of the disclosure.

FIG. 4B illustrates a method for computing a micro-feature value based on the pixel-level hue characteristic, according to one embodiment of the disclosure. As shown, one method for performing step 375 of FIG. 3B begins at step 430 where the characteristic computation unit 310 outputs the pixel-level characteristic of hue values for the foreground patch. At step 432 the micro-feature extractor 320 computes the hue entropy for the foreground patch. The following equation (Equation 1) may be used to compute the hue entropy value:

$$\text{Entropy} \equiv \sum_{k=1}^{N} P_k \log_2(P_k)/\log_2 N,$$

where N is the number of pixels in the foreground patch and P is the hue. The hue entropy value is a normalized value between 0 and 1. At step 434 the micro-feature extractor 320 sets the micro-feature value to the computed entropy value for the foreground patch. The computed hue entropy value is included as an element of a micro-feature vector with an object identifier corresponding to the foreground patch.

Figure 4C:
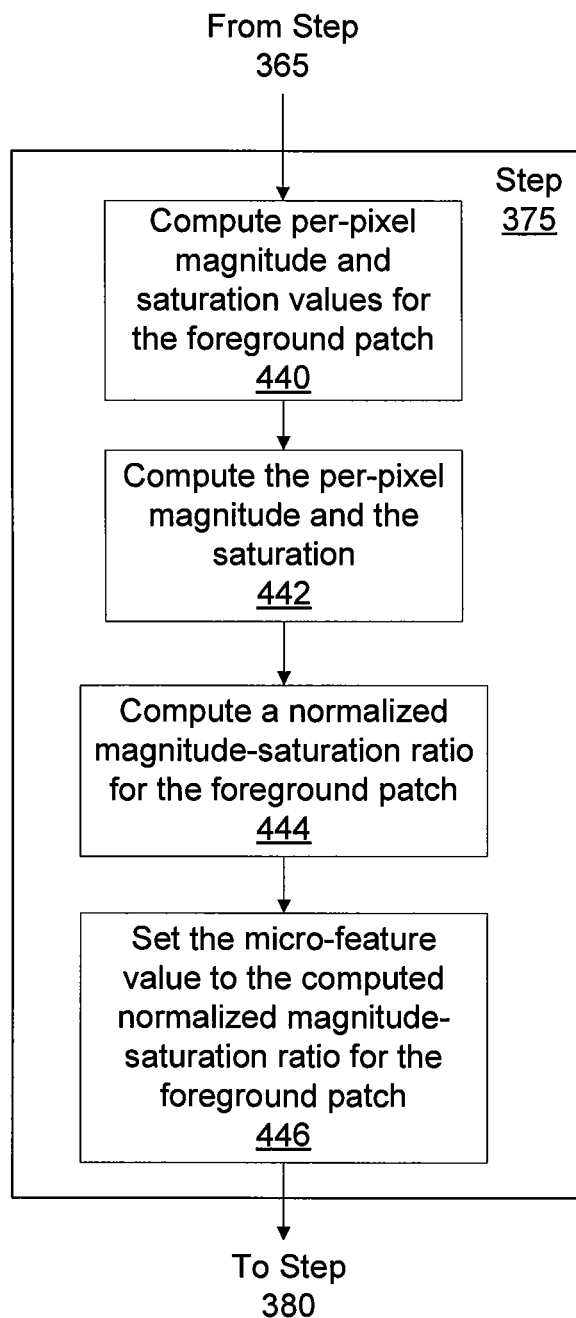
FIG. 4C illustrates a method for computing a micro-feature value based on the pixel-level magnitude-saturation ratio characteristic, according to one embodiment of the disclosure.

FIG. 4C illustrates a method for computing a micro-feature value based on the pixel-level magnitude-saturation ratio (shininess or specular reflectivity) characteristic, according to one embodiment of the disclosure. In addition to hue, colors include a magnitude and saturation components that may be used to compute a micro-feature value. The characteristic computation unit 310 performs gray-channel equalization on the foreground patch to produce magnitude and saturation values as a pixel-level characteristic. As shown, another method for performing step 375 of FIG. 3B begins at step 440 where the micro-feature extractor 320 receives magnitude and saturation values from the characteristic computation unit 310. At step 442 the micro-feature extractor 320 computes the per-pixel magnitude and the per-pixel saturation to produce an ensemble of magnitude-saturation ratios for the foreground patch. At step 444 the micro-feature extractor 320 computes a normalized magnitude-saturation ratio using the ensemble of magnitude-saturation ratios for the foreground patch. At step 446 the micro-feature extractor 320 sets the micro-feature value to the computed normalized magnitude-saturation ratio for the foreground patch. The computed normalized magnitude-saturation ratio value is included as an element of a micro-feature vector with an object identifier corresponding to the foreground patch.

Figure 4D:
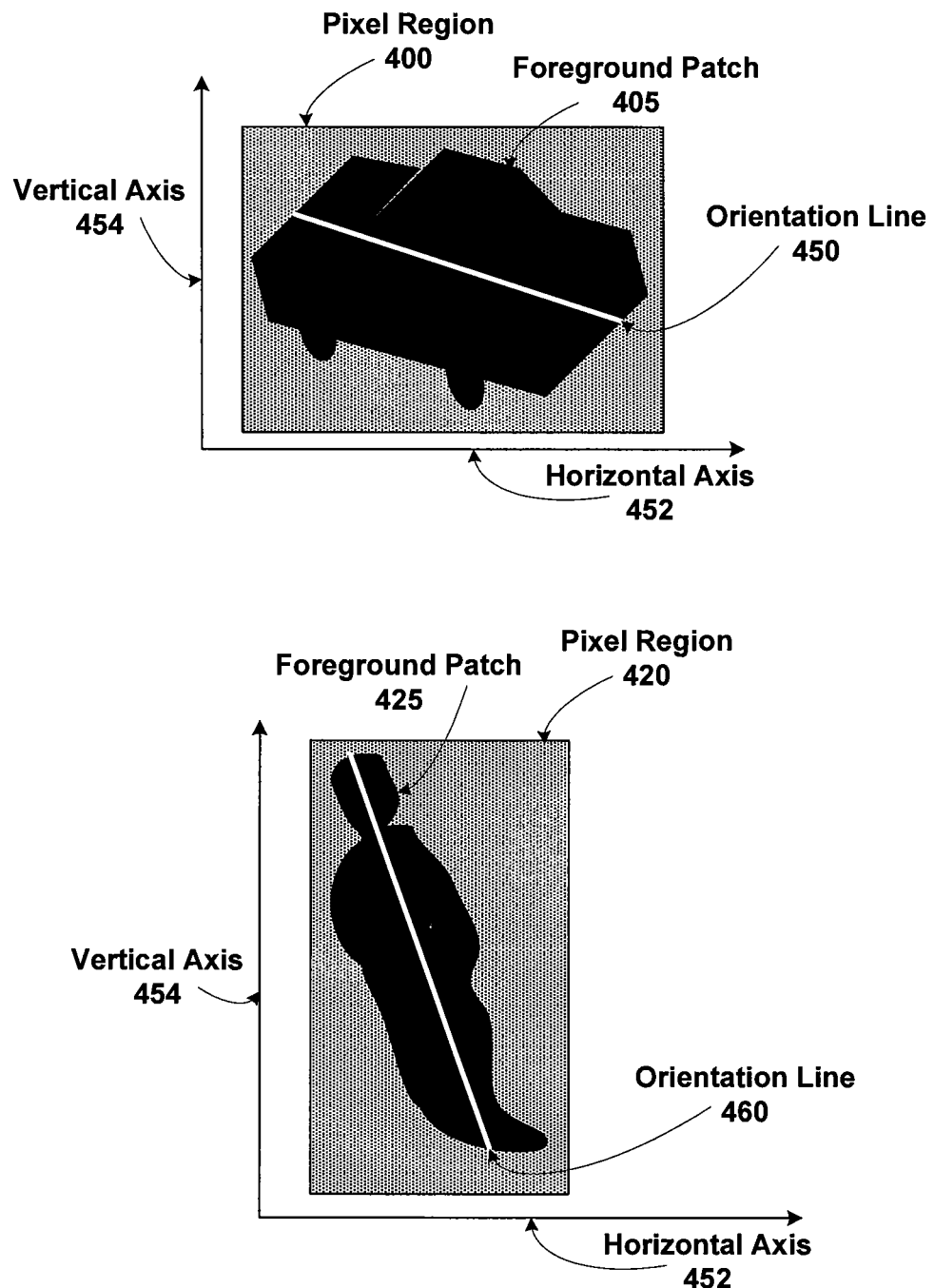
FIG. 4D illustrates a graphical representation of foreground patches and corresponding orientation lines, according to one embodiment of the disclosure.

FIG. 4D illustrates a graphical representation of foreground patches 405 and 425 and corresponding orientation lines 450 and 460, according to one embodiment of the disclosure. Again, pixel region 400 includes a foreground patch 405 depicting a first foreground object and pixel region 420 includes a foreground patch 425 depicting a second foreground object that should be classified in a different object type cluster than the first foreground object. The orientation lines 450 and 460 indicate an orientation of the foreground patch 405 and 425, respectively, relative to a horizontal axis 452 and a vertical axis 454. Notice that the orientation line 450 is more closely aligned with the horizontal axis 452, in contrast with the orientation line 460 that is more closely aligned with the vertical axis 454. Based on the analysis of many images and image sequences, foreground patches corresponding to vehicles are more likely to be horizontally oriented, compared with foreground patches corresponding to people that are more likely to be vertically oriented. Therefore, major axis alignment is a micro-feature value that may contribute to classifying the foreground patch into a particular object type cluster over another object type cluster.

Figure 4E:
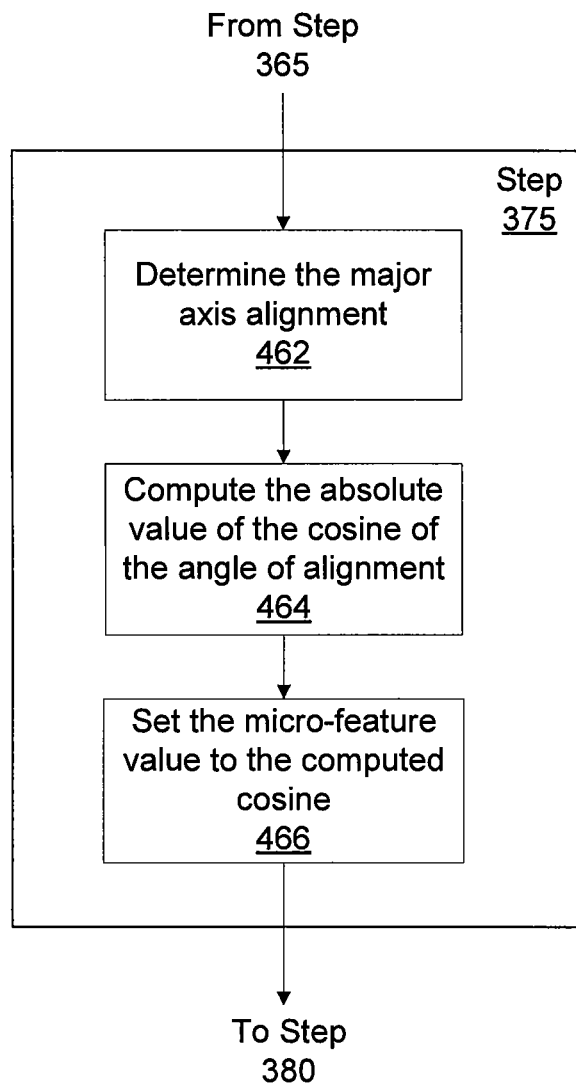
FIG. 4E illustrates a method for computing a micro-feature value based on the pixel-level orientation characteristic, according to one embodiment of the disclosure.

FIG. 4E illustrates a method for computing a micro-feature value based on the pixel-level orientation characteristic, according to one embodiment of the disclosure. As shown, another method for performing step 375 of FIG. 3B begins at step 462 where the micro-feature extractor 320 determines the major axis alignment of the foreground based on the orientation line that is provided by the characteristic computation unit 310. At step 464 the micro-feature extractor 320 computes the absolute value of the cosine of the angle of alignment for the orientation line. At step 466 the micro-feature extractor 320 sets the micro-feature value to the absolute value of the computed cosine of the angle of alignment for the orientation line of the foreground patch. The absolute value of the computed cosine of the angle of alignment is included as an element of a micro-feature vector with an object identifier corresponding to the foreground patch.

Figure 4F:
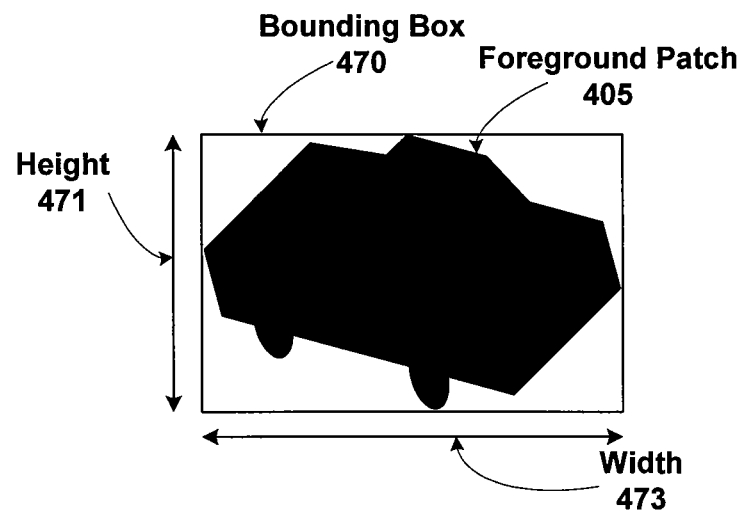
FIG. 4F illustrates a graphical representation of foreground patches and corresponding bounding boxes, according to one embodiment of the disclosure.
Figure 4F:
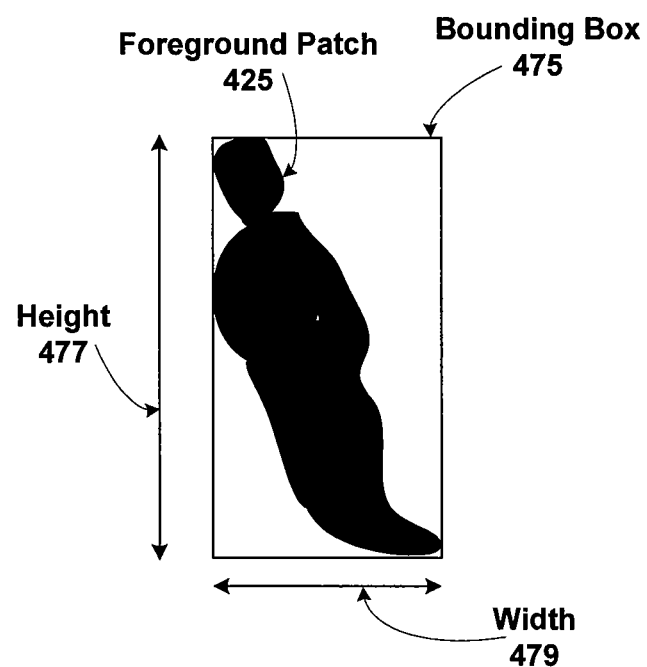

FIG. 4F illustrates a graphical representation of foreground patches 405 and 425 and corresponding bounding boxes 470 and 475, according to one embodiment of the disclosure. Bounding box 470 has a height 471 and width 473 encloses foreground patch 405 and bounding box 475 has a height 477 and width 479 that encloses foreground patch 425. Notice that foreground patch 405 covers more pixels within bounding box 470 compared with the number of pixels within the bounding box 475 that are covered by the foreground patch 425. Based on the analysis of many images and image sequences, foreground patches corresponding to vehicles are more likely to be have a greater normalized area (area of the foreground object divided by the area of the bounding box), compared with foreground patches corresponding to people that are more likely to have a smaller normalized area. Therefore, normalized area is a micro-feature value that may contribute to classifying the foreground patch into a particular object type cluster over another object type cluster.

Similarly, notice that the aspect ratio (height/width) of the bounding box 470 is lower (shorter) compared with the aspect ratio of the bounding box 475. Based on the analysis of many images and image sequences, foreground patches corresponding to vehicles are more likely to be have a lower aspect ratios, compared with foreground patches corresponding to people that are more likely to have a higher (taller) aspect ratios. Therefore, aspect ratio is a micro-feature value that may contribute to classifying the foreground patch into a particular object type cluster over another object type cluster.

Figure 4G:
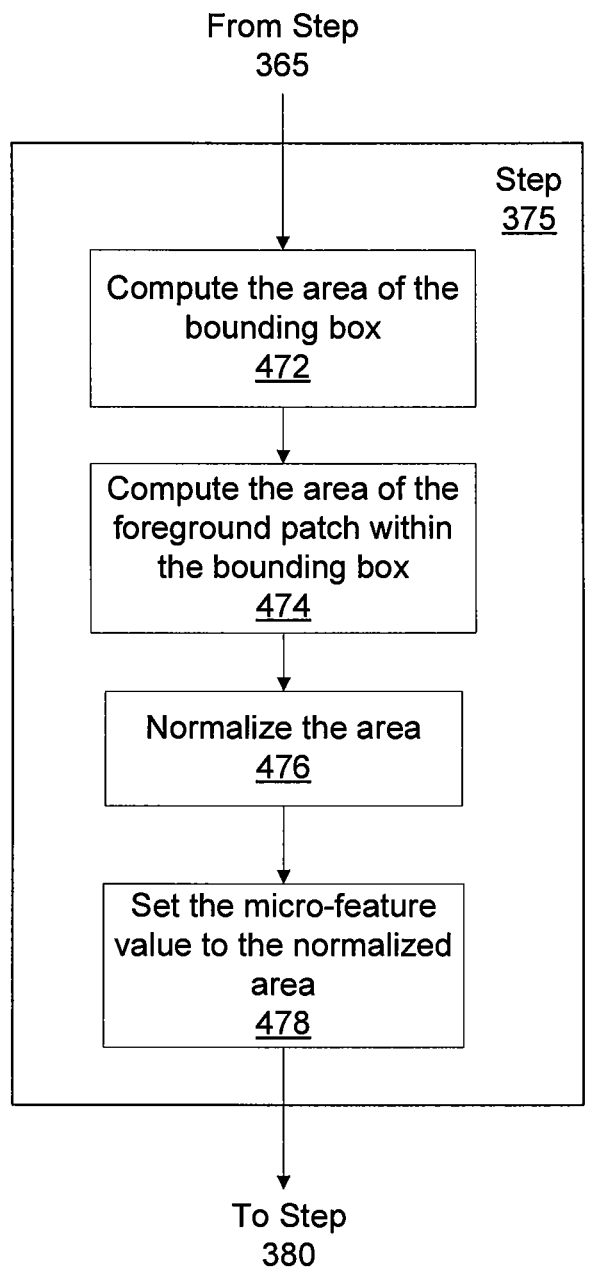
FIG. 4G illustrates a method for computing a micro-feature value based on a pixel-level bounding box characteristic, according to one embodiment of the disclosure.

FIG. 4G illustrates a method for computing a micro-feature value based on the foreground patch area characteristic, according to one embodiment of the disclosure. As shown, another method for performing step 375 of FIG. 3B begins at step 472 where the micro-feature extractor 320 determines the area of the bounding box (pixel region) that is provided by the characteristic computation unit 310. At step 474 where the micro-feature extractor 320 determines the area of the foreground patch. At step 476 the micro-feature extractor 320 computes the normalized area of the foreground patch by dividing the area of the foreground patch by the area of the bounding box. At step 478 the micro-feature extractor 320 sets the micro-feature value to the computed normalized area of the foreground patch. The computed normalized area value is included as an element of a micro-feature vector with an object identifier corresponding to the foreground patch.

Figure 4H:
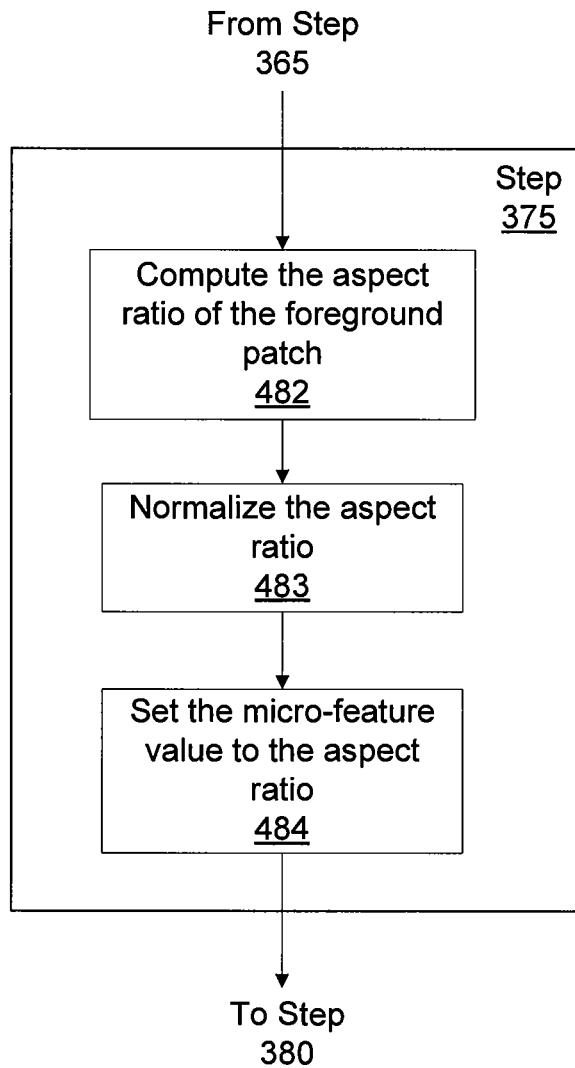
FIG. 4H illustrates another method for computing a micro-feature value based on the pixel-level bounding box characteristic, according to one embodiment of the disclosure.

FIG. 4H illustrates a method for computing a micro-feature value based on the bounding box aspect area characteristic, according to one embodiment of the disclosure. As shown, another method for performing step 375 of FIG. 3B begins at step 482 where the micro-feature extractor 320 determines the aspect ratio of the foreground patch based on the bounding box (pixel region) that is provided by the characteristic computation unit 310. The height may be dived by the width or the width may be divided by the height to compute the aspect ratio of the bounding box. At step 483 the aspect ratio is normalized. At step 484 the micro-feature extractor 320 sets the micro-feature value to the computed (normalized) aspect ratio of the foreground patch. The computed aspect ratio value is included as an element of a micro-feature vector with an object identifier corresponding to the foreground patch.

Figure 5A:
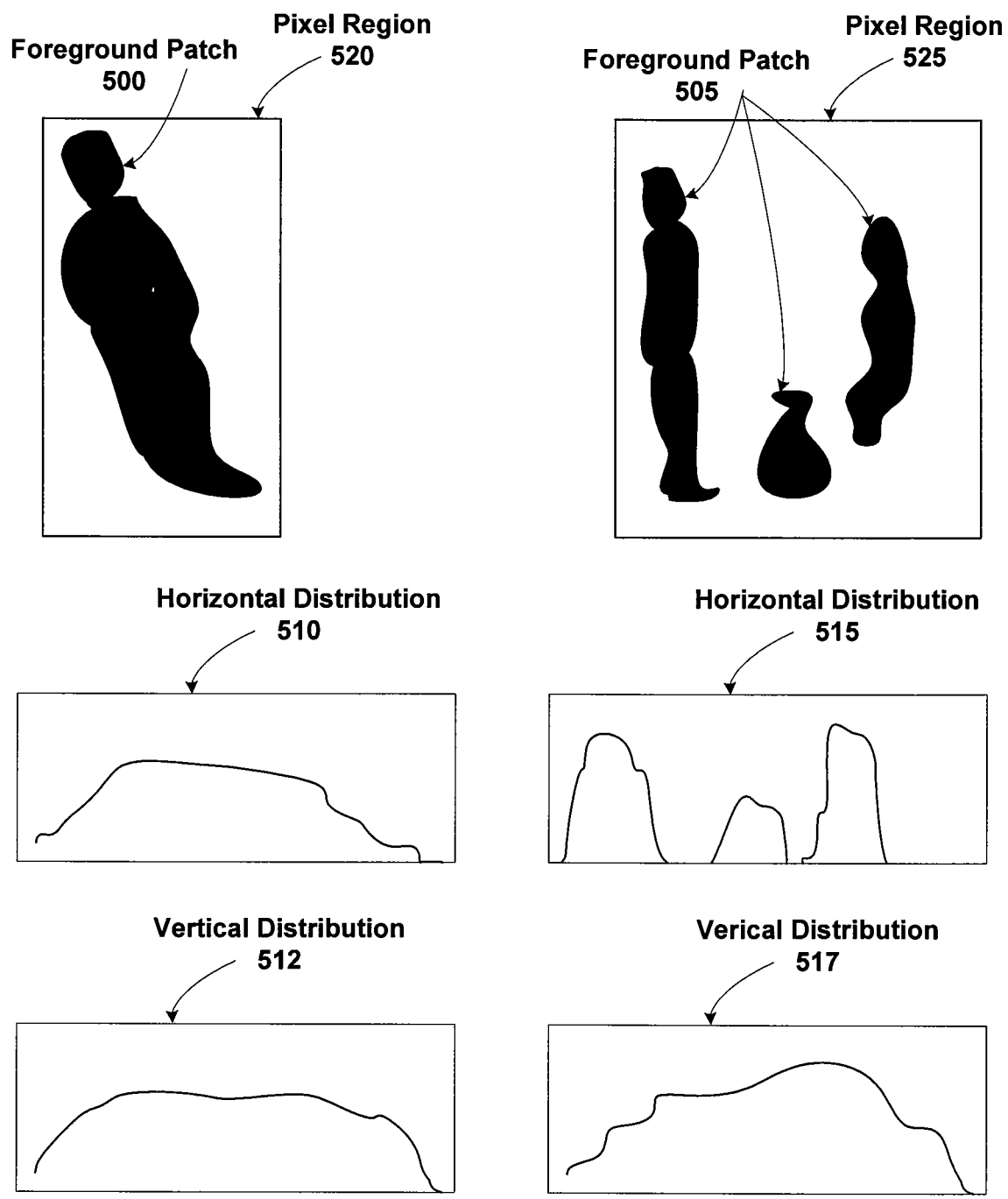
FIG. 5A illustrates a graphical representation of foreground patches and corresponding pixel distribution graphs, according to one embodiment of the disclosure.

FIG. 5A illustrates a graphical representation of foreground patches 500 and 505 and corresponding pixel distribution graphs 510, 512, 515, and 517, according to one embodiment of the disclosure. Pixel region 520 includes a foreground patch 500 depicting a first foreground object. The horizontal distribution graph 510 indicates a count of pixels covered by the foreground patch 500 for each of the different positions along the horizontal axis. The vertical distribution graph 512 indicates a count of pixels covered by the foreground patch 500 for each of the different positions along the vertical axis. Pixel region 525 includes a foreground patch 505 depicting a second foreground object that should be classified into a different object type cluster than the first foreground object. The horizontal distribution graph 515 indicates a count of pixels covered by the foreground patch 505 for each of the different positions along the horizontal axis. The vertical distribution graph 517 indicates a count of pixels covered by the foreground patch 505 for each of the different positions along the vertical axis. Notice that the horizontal pixel distribution of the foreground patch 500 shown in horizontal distribution graph 510 has a single local maximum (peak) compared with the horizontal pixel distribution of the foreground patch 505 shown in horizontal distribution graph 515 which has three distinct local maximums. Based on the analysis of many images and image sequences, foreground patches corresponding to multiple objects (object groups) have multiple local maximums in at least one of the horizontal or vertical distribution graphs, compared with foreground patches corresponding to a single object. Therefore, horizontal and vertical pixel distribution (groupiness) is a micro-feature value that may contribute to classifying the foreground patch into a particular object type cluster over another object type cluster or over individual objects.

Figure 5B:
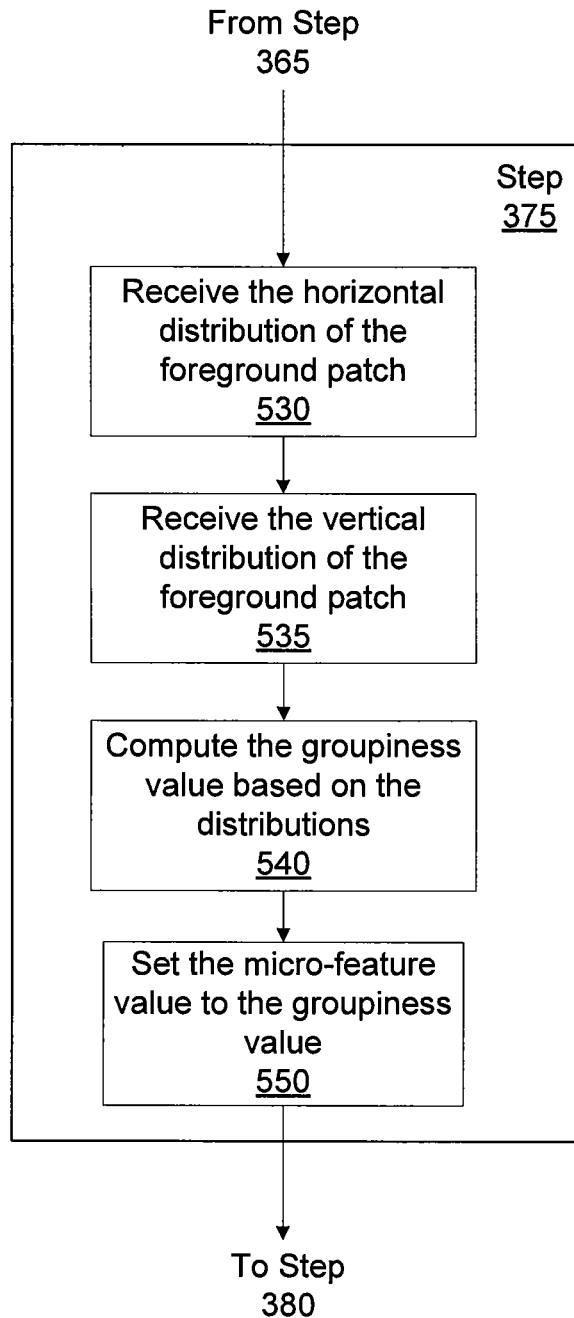
FIG. 5B illustrates a method for computing a micro-feature value based on pixel-level distribution characteristic, according to one embodiment of the disclosure.

FIG. 5B illustrates a method for computing a micro-feature value based on the pixel distribution characteristic, according to one embodiment of the disclosure. As shown, another method for performing step 375 of FIG. 3B begins at step 530 where the micro-feature extractor 320 receives the horizontal pixel distribution of the foreground patch that is determined by the characteristic computation unit 310. At step 535 the micro-feature extractor 320 receives the vertical pixel distribution of the foreground patch that is determined by the characteristic computation unit 310. At step 540 the micro-feature extractor 320 computes the groupiness value based on the distribution. The groupiness value is computed using the following equation, (number of vertical peaks+number of horizontal peaks−2)/5. For a single object the equation will produce a groupiness value of 0 (number of vertical peaks=number of horizontal peaks=1). For multiple objects consisting of 6 individual objects the equation will produce a groupiness value of 1 (for example, number of vertical peaks=6, number of horizontal peaks=1, produces a value of 1). When the computed groupiness value is greater than 1 it is clamped to 1. Note that the denominator of 5 may be changed to a different number to tune the micro-feature extractor 320.

At step 550 the micro-feature extractor 320 sets the micro-feature value to the computed groupiness value of the foreground patch. The computed groupiness value is included as an element of a micro-feature vector with an object identifier corresponding to the foreground patch.

Figure 6A:
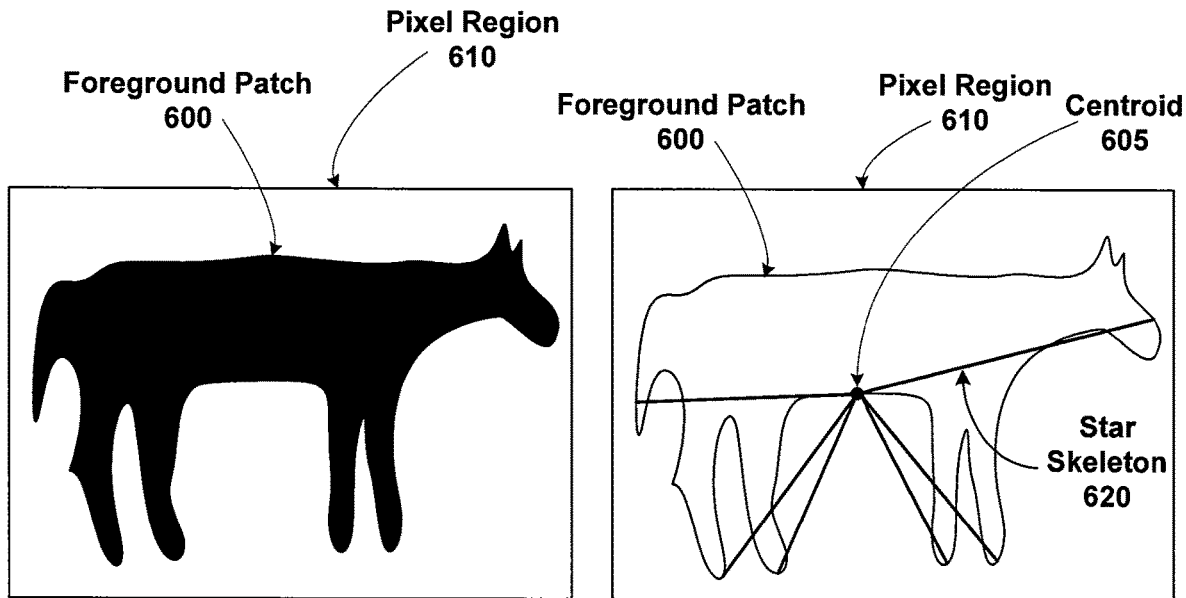
FIG. 6A illustrates a graphical representation of foreground patches and a corresponding star skeleton, according to one embodiment of the disclosure.
Figure 6A:
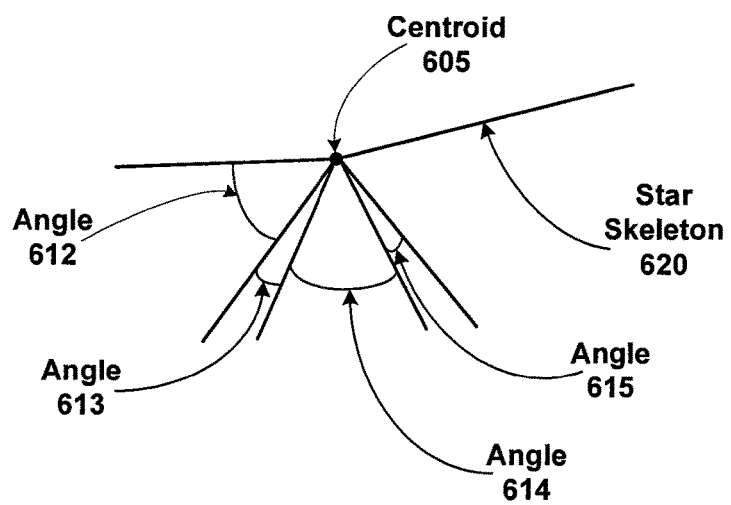

FIG. 6A illustrates a graphical representation of foreground patch 600 within pixel region 610 and a corresponding star skeleton 620, according to one embodiment of the disclosure. The characteristic computation unit 310 determines a centroid 605 of the foreground patch 600. The centroid 605 is a position that is identified by first obtaining the perimeter or boundary of a mask of the foreground patch 600. The average of the x-axis coordinates and the y-axis coordinates are computed and are the position of the centroid 605.

A segment is generated extending from the centroid to points on the outside of the foreground patch 600. The points are determined by computing the distance from each point on the boundary from the centroid. A vector is formed using the computed distances and each local maxima of the vector corresponds to a point. Each pair of neighboring segments defines an angle, e.g., angles 612, 613, 614, and 615. Notice that the angles defined by points positioned below the centroid 605 correspond to "legs" of the foreground patch 600. A legged-ness value may be computed based on measurements of these angles. Based on the analysis of many images and image sequences, foreground patches corresponding to two or more legs have a high legged-ness value, compared with foreground patches corresponding to an object have no legs or a single leg. Therefore, legged-ness is a micro-feature value that may contribute to classifying the foreground patch into a particular object type cluster over another object type cluster.

Figure 6B:
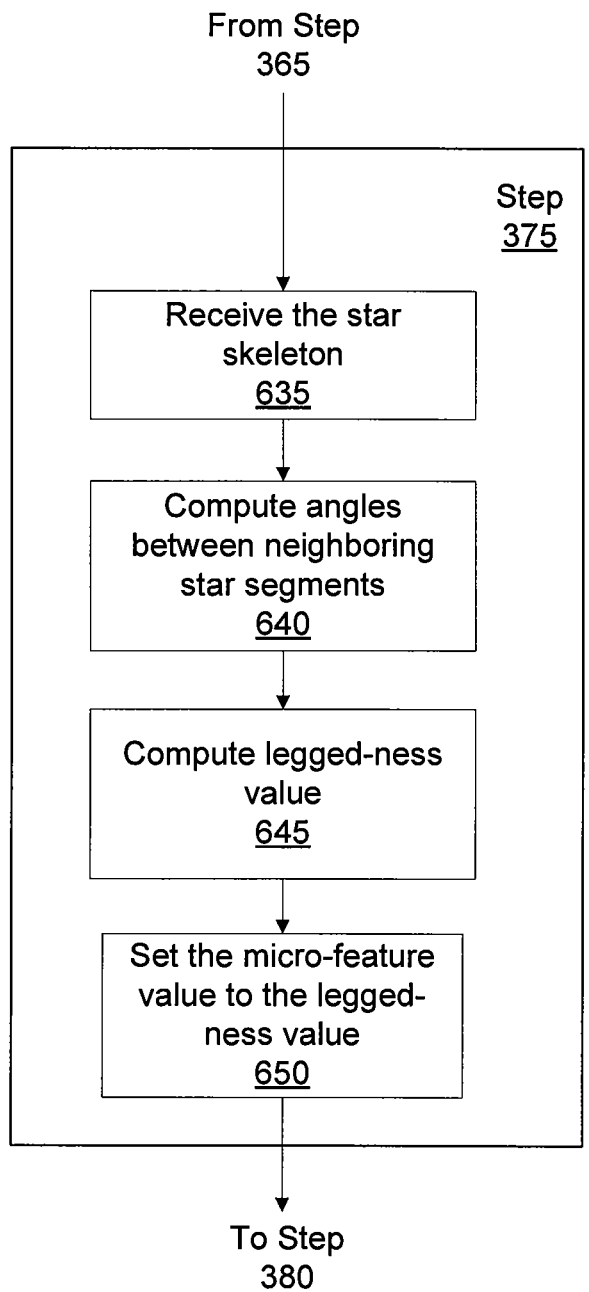
FIG. 6B illustrates a method for computing a micro-feature value based on the pixel-level star skeleton characteristic, according to one embodiment of the disclosure.

FIG. 6B illustrates a method for computing a micro-feature value based on the star skeleton characteristic, according to one embodiment of the disclosure. As shown, another method for performing step 375 of FIG. 3B begins at step 635 where the micro-feature extractor 320 receives the star skeleton of the foreground patch that is generated by the characteristic computation unit 310. At step 640 the micro-feature extractor 320 computes the angles between neighboring star segments of points that are below the centroid. In some embodiments, angles that are less than 20 degrees or greater than 140 degrees are set to a value of 0 since a small angle between legs may be inaccurate and it is unnatural to have a large angle between legs. Angles that are between 20 and 140 degrees (inclusive) are scaled to produce scaled angles. In some embodiments scaled angles for angles between 20 and 80 degrees are computed as, scaled_angle=(angle−20)/60 and scaled angles for angles between 80 and 140 degrees are computed as scaled_angle=(140−angle)/60.

At step 645 the micro-feature extractor 320 computes the legged-ness value based on the distribution. The legged-ness value may be computed by summing each scaled angle divided by a denominator equal to the number of scaled angles being summed. A legged-ness value that is greater than 1 may be clamped to 1. In some embodiments the denominator may be changed to tune the micro-feature extractor 320. At step 650 the micro-feature extractor 320 sets the micro-feature value to the computed legged-ness value of the foreground patch. The legged-ness value may be measured over several frames to accurately characterize the foreground patch. The computed legged-ness value is included as an element of a micro-feature vector with an object identifier corresponding to the foreground patch.

Figure 7A:
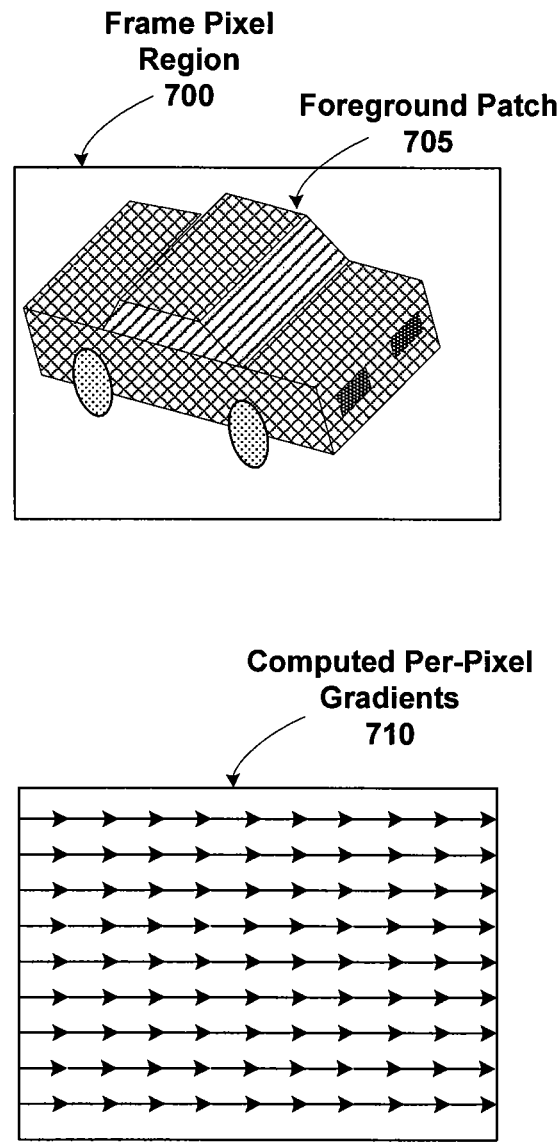
FIG. 7A illustrates a graphical representation of a foreground patch and corresponding per-pixel gradients, according to one embodiment of the disclosure.

FIG. 7A illustrates a graphical representation of foreground patches 705 and corresponding per-pixel gradients 710, according to one embodiment of the disclosure. A frame pixel region 700 includes the foreground patch 705 depicting a first foreground object. The computed per-pixel gradients (dx/dy) 710 is a graph indicating the instantaneous pixel-level gradients for the foreground patches 705. The horizontal gradients of a patch (dx) are computed by filtering the patch with [−1 0 1]. The vertical gradients (dy) are computed by filtering the patch with $$\begin{bmatrix} 1 \\ 0 \\ -1 \end{bmatrix}.$$

As shown in FIG. 7A, the pixel-level gradients indicate that the first foreground object is moving in a horizontal direction. Based on the analysis of many images, foreground patches of foreground objects in the same object type cluster as the first foreground object have horizontal per-pixel gradients, compared with foreground patches of foreground objects that depict humans that have vertical per-pixel gradients. Therefore, per-pixel gradients are a micro-feature value that may contribute to classifying the foreground patch into a particular object type cluster over another object type cluster.

Figure 7B:
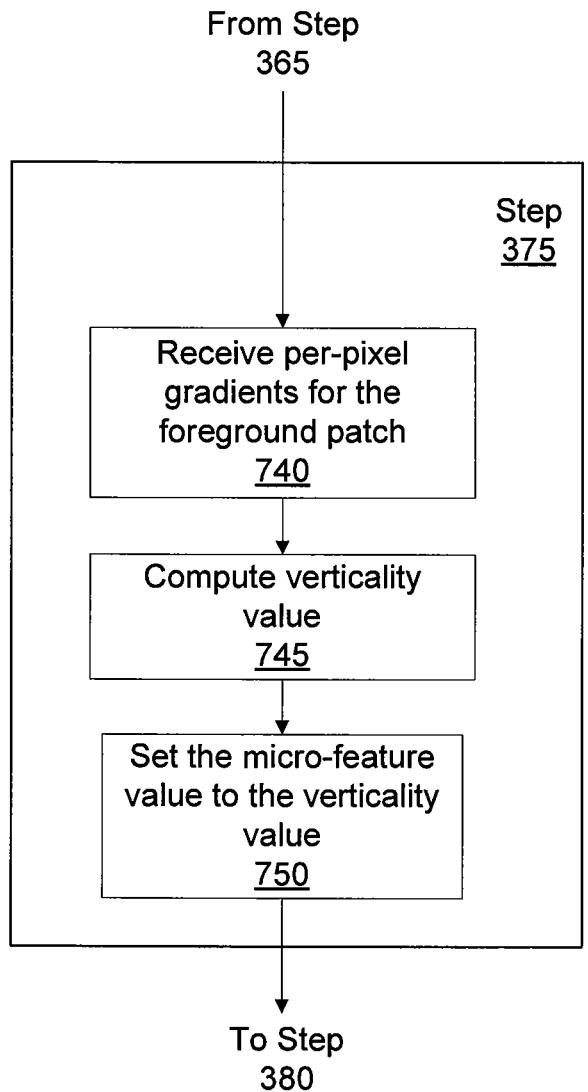
FIG. 7B illustrates a method for computing a micro-feature value based on the pixel-level gradient characteristic, according to one embodiment of the disclosure.

FIG. 7B illustrates a method for computing a micro-feature value based on the per-pixel gradients characteristic, according to one embodiment of the disclosure. As shown, another method for performing step 375 of FIG. 3B begins at step 740 where the micro-feature extractor 320 receives the per-pixel gradients of a frame pixel region including the foreground patch from the characteristic computation unit 310. At step 745 the micro-feature extractor 320 computes the verticality value based on the per-pixel gradients. The verticality value is computed by summing the number of pixels having gradient angles between 171 and 180 degrees. The sum is normalized by norm_ver=(width/3)*0.2) *height−(height/3)*0.2*2), where width and height are dimensions of the foreground patch. The norm_ver value may be modified to tune the micro-feature extractor 320. At step 750 the micro-feature extractor 320 sets the micro-feature value to the computed verticality value of the foreground patch. The verticality value may be measured over several frames to accurately characterize the foreground patch. The computed verticality value is included as an element of a micro-feature vector with an object identifier corresponding to the foreground patch.

Figure 7C:
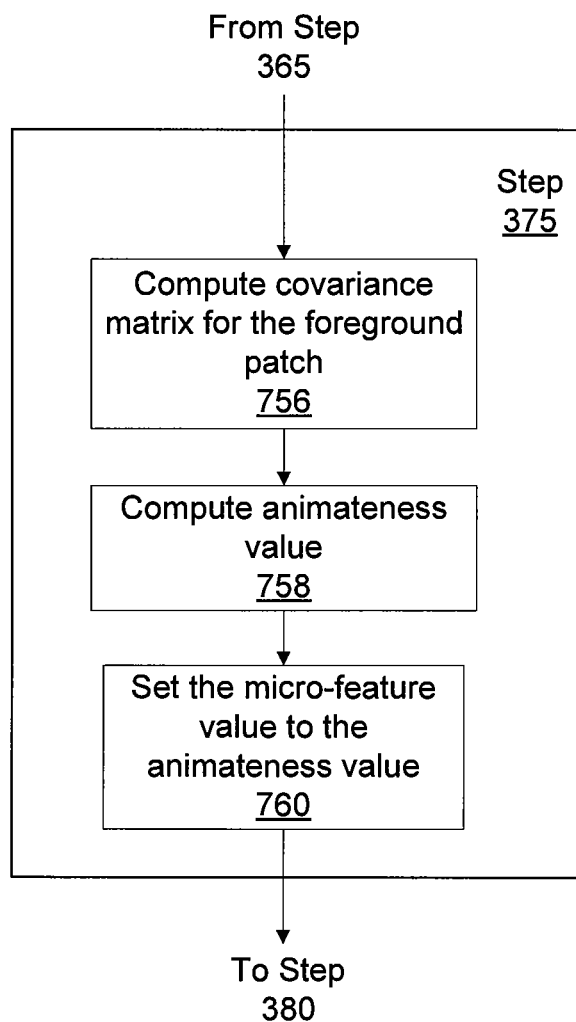
FIG. 7C illustrates a method for computing a micro-feature value based on the pixel-level covariance matrix characteristic, according to one embodiment of the disclosure.

FIG. 7C illustrates a method for computing a micro-feature value based on the covariance matrix characteristic, according to one embodiment of the disclosure. Similar to the per-pixel gradients, a change in silhouette of a foreground patch may be used to distinguish between different object types. Foreground patches that depict people tend to have a high animateness (highly changing silhouette) compared with foreground patches that depict vehicles which are more rigid (no or small changes to the silhouette). The animateness may be indicated by the change in position of the pixels within the foreground patch. A covariance matrix is determined for each new frame pixel region that indicates the change in position for each pixel in the foreground patch. Therefore, an animateness value that is computed using covariance matrices is a micro-feature value that may contribute to classifying the foreground patch into a particular object type cluster over another object type cluster.

As shown, another method for performing step 375 of FIG. 3B begins at step 756 where the micro-feature extractor 320 receives a covariance matrix for the foreground patch that is generated by the characteristic computation unit 310. At step 758 the micro-feature extractor 320 computes the animateness value using the covariance matrix. The animateness is computes as the accumulated changing rate of the covariance matrix. The following equation (Equation 2) provides the definition of the covariance matrix for the foreground patch, where $\{x_k, y_k | k=1, N\}$ are silhouette pixel positions in the foreground patch image.

$$\text{Covariance} \equiv \begin{bmatrix} C_{xx} & C_{xy} \\ C_{yx} & C_{yy} \end{bmatrix}, \quad \text{(Equ. 2)}$$

$$C_{xx} \equiv \frac{1}{N-1} \sum_{k=1}^{N} (x_k - x_{mean})^2,$$

$$C_{yy} \equiv \frac{1}{N-1} \sum_{k=1}^{N} (y_k - y_{mean})^2, \text{ and}$$

$$C_{xy} \equiv C_{xy} \equiv \frac{1}{N-1} \sum_{k=1}^{N} (x_k - x_{mean})(y_k - y_{mean}).$$

The following equation (Equation 3) may be used to compute a metric distance between covariance matrices:

$$\text{Distance}(\text{COV}_1, \text{COV}_2) \equiv \sqrt{\sum_{k=1}^{2} \ln^2 S_k(\text{COV}_1, \text{COV}_2)}, \quad \text{(Equ. 3)}$$

Where $\{S_1(\text{COV}_1, \text{COV}_2), S_2(\text{COV}_1, \text{COV}_2)\}$ are the generalized eigenvalues of the covariance matrices, $\text{COV}_1$ and $\text{COV}_2$. The following equation (Equation 4) may be used to compute the animateness value:

$$\text{Animateness (time} \equiv t) \equiv \frac{1}{t} \sum_{k=1}^{t-1} (\text{COV}_{k+1}, \text{COV}_k). \quad \text{(Equ. 4)}$$

The following equation (Equation 5) may be used to compute the normalized animateness value:

$$\text{Animateness (time} \equiv t) \equiv \frac{[\text{Animateness (time} \equiv t) - A_{min}]}{A_{max} - A_{min}} \quad \text{(Equ. 5)}$$

At step 760 the micro-feature extractor 320 sets the micro-feature value to the computed animateness value of the foreground patch. The animateness value may be measured over several frames to accurately characterize the foreground patch. The computed animateness value is included as an element of a micro-feature vector with an object identifier corresponding to the foreground patch.

Figure 7D:
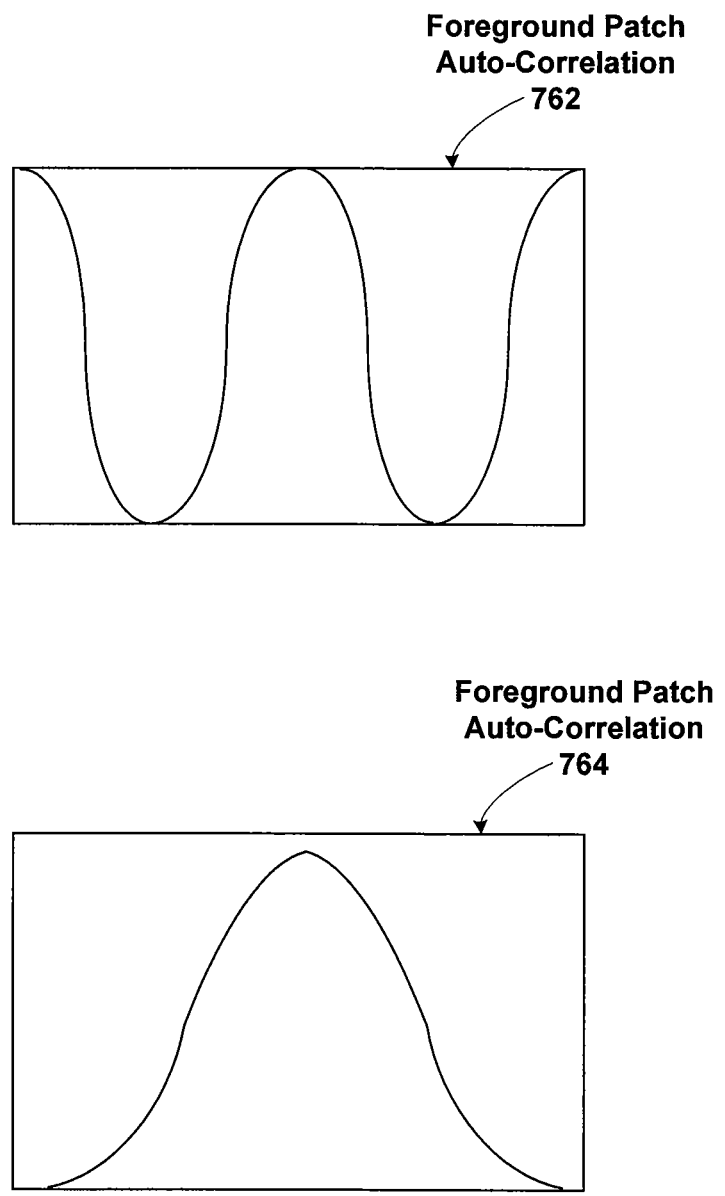
FIG. 7D illustrates a graphical representation of the periodic and aperiodic changes in a given sequence of foreground patches, according to one embodiment of the disclosure.

FIG. 7D illustrates a graphical representation of the auto-correlation spectrum of foreground patches, according to one embodiment of the disclosure. The auto-correlation of a first foreground object is shown in foreground patch auto-correlation 762. The auto-correlation spectrum of a second foreground object is shown in foreground patch auto-correlation 764. Notice that the periodic movement of the first foreground object that depicts a person is a higher frequency or periodicity compared with the periodic movement of the second foreground object that depicts a vehicle. Based on the analysis of many images and image sequences, foreground patches depicting vehicles have no periodicity, compared with foreground patches depicting people that have higher periodicity. Therefore, the periodic motion is a micro-feature value that may contribute to classifying the foreground patch into a particular object type cluster over another object type cluster.

Figure 7E:
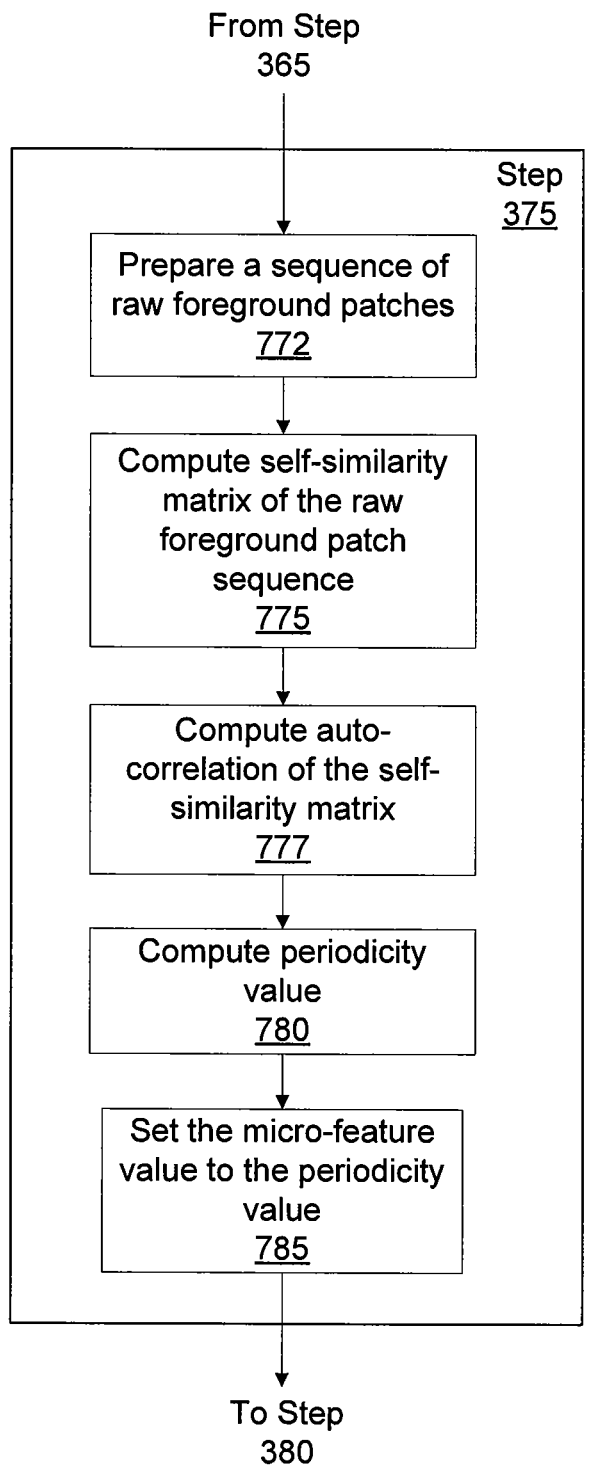
FIG. 7E illustrates a method for computing a micro-feature value based on the pixel-level periodic and aperiodic change characteristic, according to one embodiment of the disclosure.

FIG. 7E illustrates a method for computing a micro-feature value based on the frequency spectrum characteristic, according to one embodiment of the disclosure. As shown, another method for performing step 375 of FIG. 3B begins at step 772 where the micro-feature extractor 320 receives a sequence of raw foreground patches that are prepared by the characteristic computation unit 310. At step 775 the micro-feature extractor 320 computes the self-similarity matrix of the sequence of raw foreground patches. At step 777 the micro-feature extractor 320 computes the auto-correlation of the self-similarity matrix. At step 780 the micro-feature extractor 320 computes a periodicity value, using techniques known to those skilled in the art, based on the auto-correlation of the self-similarity matrix. At step 785 the micro-feature extractor 320 sets the micro-feature value to the computed periodicity value of the foreground patch. The periodicity value may be measured over several frames to accurately characterize the foreground patch. The computed periodicity value is included as an element of a micro-feature vector with an object identifier corresponding to the foreground patch.

Advantageously, embodiments of the disclosure may be used as part of a computer vision engine to extract micro-features from individual pixel regions and pixel regions in a sequence of video frames and produce micro-feature vectors. Importantly, the computer vision engine requires no training in order to perform the micro-feature extraction. The machine learning engine receives the micro-feature vectors and performs micro-classification to group the foreground patches into object type clusters. Computation of each of the different micro-feature values may be enabled and disabled and threshold values may be programmed to determine whether or not a valid micro-feature value is output for each foreground patch.

While the foregoing is directed to embodiments of the present disclosure, other and further embodiments of the disclosure may be devised without departing from the basic scope thereof, and the scope thereof is determined by the claims that follow.

The invention claimed is:

1. A system, comprising:
    at least one processor; and
    a memory in communication with the at least one processor and storing instructions for the at least one processor to:
        generate a micro-feature vector based on at least one of the kinematics of an object in a video scene or an appearance of the object in the video scene;
        update a neural network based at least in part on the micro-feature vector to produce an updated neural network, the neural network including a plurality of clusters, each cluster from the plurality of clusters representing an object type,
        classify the object as a first object type based on the updated neural network, the first object type being represented by a first cluster from the plurality of clusters, and
        track the object in the video scene based on the micro-feature vector and the first object type.

2. The system of claim 1, wherein the instructions for the at least one processor to update the neural network include instructions for the at least one processor to:
    evaluate a rank for each cluster from the plurality of clusters relative to the micro-feature vector, and
    evaluate each cluster from the plurality of clusters to determine if the object maps to at least one cluster from the plurality of clusters based on the rank for each cluster.

3. The system of claim 1, wherein the instructions for the at least one processor to update the neural network include instructions for the at least one processor to generate the first cluster representing the first object type.

4. The system of claim 1, wherein the instructions for the at least one processor to update the neural network include instructions for the at least one processor to update the first cluster based on the micro-feature vector.

5. The system of claim 1, wherein the instructions include instructions for the at least one processor to reinforce a machine learning pattern as events occur and re-occur within the video scene.

6. A processor-implemented method, comprising:
    generating a micro-feature vector based on at least one of kinematics of an object in a video scene or an appearance of the object in the video scene;
    updating a neural network based on the micro-feature vector to produce an updated neural network, the neural network including a plurality of clusters, each cluster from the plurality of clusters representing an object type;
    classifying the object as a first object type based at least in part on the updated neural network, the first object type being associated with a first cluster from the plurality of clusters; and
    tracking the object based on the micro-feature vector and the first object type.

7. The processor-implemented method of claim 6, wherein updating the neural network includes generating the first cluster.

8. The processor-implemented method of claim 6, wherein updating the neural network includes updating the first cluster based on the micro-feature vector.

9. The processor-implemented method of claim 6, comprising generating a plurality of micro-feature vectors, the plurality of micro-feature vectors including the micro-feature vector, the method further comprising:
    generating the plurality of clusters based on the plurality of micro-feature vectors.

10. The processor-implemented method of claim 6, wherein at least one micro-feature value associated with the micro-feature vector includes a verticality of the foreground patch.

11. The processor-implemented method of claim 6, further comprising evaluating a rank for each cluster from the plurality of clusters relative to the micro-feature vector.

12. The processor-implemented method of claim 6, further comprising evaluating each cluster from the plurality of clusters to determine whether the object maps to at least one cluster from the plurality of clusters based on the ranking for each cluster.

13. The processor-implemented method of claim 6, further comprising reinforcing a machine learning pattern as events occur and re-occur within the video scene.

14. A non-transitory processor-readable storage medium storing processor-executable instructions to:
    generate a micro-feature vector based on at least one of kinematics of an object in a video scene or an appearance of the object in the video scene;
    update a neural network based on the micro-feature vector to produce an updated neural network, the neural network including a plurality of clusters, each cluster from the plurality of clusters representing an object type;
    classify the object as a first object type based at least in part on the updated neural network, the first object type being associated with a first cluster from the plurality of clusters; and track the object based on at least one of the micro-feature vector or the first object type.

15. The non-transitory processor-readable storage medium of claim 14, wherein the instructions to update the neural network include instructions to generate the first cluster.

16. The non-transitory processor-readable storage medium of claim 14, wherein the instructions to update the neural network include instructions to update the first cluster based on the micro-feature vector.

17. The non-transitory processor-readable storage medium of claim 14, wherein at least one micro-feature value associated with the micro-feature vector includes a verticality of a foreground patch representing a portion of the video scene.

18. The non-transitory processor-readable storage medium of claim 14, further comprising determining the kinematics of the object based on at least one pixel-level characteristic of a video frame associated with the video scene.

19. The non-transitory processor-readable storage medium of claim 14, wherein the instructions further include instructions to evaluate a rank for each cluster from the plurality of clusters relative to the micro-feature vector.

20. The non-transitory processor-readable storage medium of claim 14, further storing processor-executable instructions to reinforce a machine learning pattern as events occur and re-occur within the video scene.

\* \* \* \* \*